US011906370B2

(12) United States Patent
Irie et al.

(10) Patent No.: US 11,906,370 B2
(45) Date of Patent: *Feb. 20, 2024

(54) STRESS DISTRIBUTION MEASUREMENT METHOD AND STRESS DISTRIBUTION MEASUREMENT SYSTEM

(71) Applicant: Panasonic Intellectual Property Management Co., Ltd., Osaka (JP)

(72) Inventors: Yousuke Irie, Nara (JP); Ryoji Hirose, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 290 days.

This patent is subject to a terminal disclaimer.

(21) Appl. No.: 17/124,735

(22) Filed: Dec. 17, 2020

(65) Prior Publication Data

US 2021/0102846 A1 Apr. 8, 2021

Related U.S. Application Data

(63) Continuation of application No. 16/101,812, filed on Aug. 13, 2018, now Pat. No. 10,900,844, which is a
(Continued)

(30) Foreign Application Priority Data

Feb. 15, 2016 (JP) .................................. 2016-026247

(51) Int. Cl.
*G01N 25/72* (2006.01)
*G01K 5/56* (2006.01)
(Continued)

(52) U.S. Cl.
CPC ................ *G01K 5/56* (2013.01); *G01L 1/248* (2013.01); *G01M 5/0008* (2013.01);
(Continued)

(58) Field of Classification Search
CPC ....... G01K 5/56; G01L 1/248; G01M 5/0008; G01M 5/0091; G01M 11/081;
(Continued)

(56) References Cited

U.S. PATENT DOCUMENTS 6,181,841 B1 * 1/2001 Hodge .................. G01B 11/16
385/12
9,772,193 B1 * 9/2017 Mendelson ........... H04W 76/50
(Continued)

FOREIGN PATENT DOCUMENTS

JP 2003-166870 6/2003
JP 3896465 1/2007
(Continued)

OTHER PUBLICATIONS

English translation of Preliminary Report on Patentability dated Aug. 30, 2018 in International (PCT) Application No. PCT/JP2016/005070.
(Continued)

*Primary Examiner* — Christine S. Kim
(74) *Attorney, Agent, or Firm* — Wenderoth, Lind & Ponack, L.L.P.

(57) ABSTRACT

A method is disclosed for measuring stress distribution generated on a structural object including two support parts and a beam part provided between the support parts. The method includes: generating first data by sensing, through a first sensing unit, of a moving object or an identification display object attached to the structural object; calculating, based on the first data, a movement duration in which the moving object moves between the support parts; generating, as second data, thermal data by sensing of a surface of the beam part through a second sensing unit; calculating a temperature change amount based on a second data group corresponding to the movement duration; and calculating a
(Continued)

stress change amount based on the temperature change amount to calculate stress distribution based on the stress change amount.

3 Claims, 23 Drawing Sheets

Related U.S. Application Data continuation of application No. PCT/JP2016/005070, filed on Dec. 6, 2016.

(51) Int. Cl.
| | |
|---|---|
| *G01M 5/00* | (2006.01) |
| *G01L 1/24* | (2006.01) |
| *G01M 99/00* | (2011.01) |
| *G01M 11/08* | (2006.01) |
| *G06T 7/00* | (2017.01) |
| *G06T 7/20* | (2017.01) |
| *H04N 5/33* | (2023.01) |
| *G01G 19/02* | (2006.01) |

(52) U.S. Cl.
CPC ........ *G01M 5/0091* (2013.01); *G01M 11/081* (2013.01); *G01M 99/002* (2013.01); *G01N 25/72* (2013.01); *G06T 7/0004* (2013.01); *G06T 7/20* (2013.01); *H04N 5/33* (2013.01); *G01G 19/022* (2013.01); *G06T 2207/10048* (2013.01); *G06T 2207/20056* (2013.01); *G06T 2207/30132* (2013.01); *G06T 2207/30236* (2013.01)

(58) Field of Classification Search
CPC ... G01M 99/002; G01N 25/72; G06T 7/0004; G06T 7/20; G06T 2207/10048; G06T 2207/20056; G06T 2207/30132; G06T 2207/30236; H04N 5/33; G01G 19/022
See application file for complete search history.

(56) References Cited

U.S. PATENT DOCUMENTS

| | | |
|---|---|---|
| 10,317,256 B2 | 6/2019 | Raghavan |
| 2017/0184550 A1 | 6/2017 | Kobayashi |
| 2019/0087658 A1 | 3/2019 | De Mers |

FOREIGN PATENT DOCUMENTS

| | | |
|---|---|---|
| JP | 2008-232998 | 10/2008 |
| JP | 4367932 | 9/2009 |
| JP | 4803652 | 8/2011 |
| JP | 2011-257389 | 12/2011 |
| JP | 5327796 | 8/2013 |
| JP | 2014-228480 | 12/2014 |
| JP | 2015-141114 | 8/2015 |

OTHER PUBLICATIONS

International Search Report dated Mar. 7, 2017 in International (PCT) Application No. PCT/JP2016/005070.
Cai et al., Bridge Deck Load Testing Using Sensors and Optical Survey Equipment, 2012, Advances in Civil Engineering, vol. 2012, pp. 1-11 (Year: 2012).
Sakagami et al., Remote nondestructive evaluation technique using infrared thermography for fatigue cracks in steel bridges, Apr. 13, 2015, Fatigue and fracture Engineering of Materials and Structures, vol. 38, pp. 755-779 (Year: 2015).
Sakagami et al., Applications of infrared thermography for nondestructive testing of fatigue cracks in steel bridges, May 21, 2014, Proceedings of SPIE, vol. 9105, pp. 1-8 (Year: 2014).

* cited by examiner

Fig. 7A (VEHICLE WEIGHT INFORMATION)

| VEHICLE NUMBER | VEHICLE WEIGHT |
|---|---|

~40d

Fig. 7B (STRESS DISTRIBUTION DB)

| VEHICLE NUMBER | VEHICLE WEIGHT | STRESS DISTRIBUTION DATA |
|---|---|---|

~50d

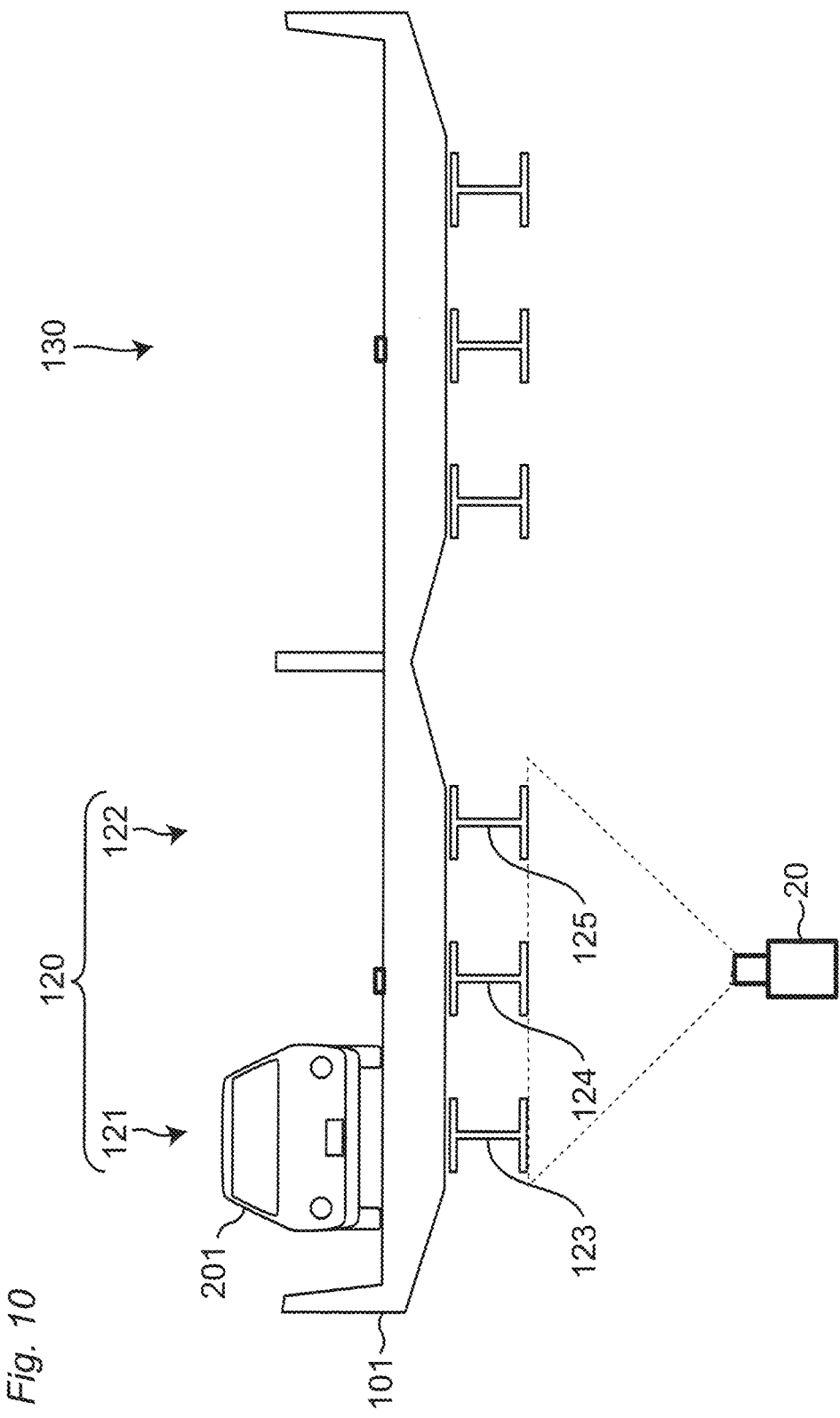

Fig. 17A (VISIBLE IMAGE ANALYSIS DEVICE)
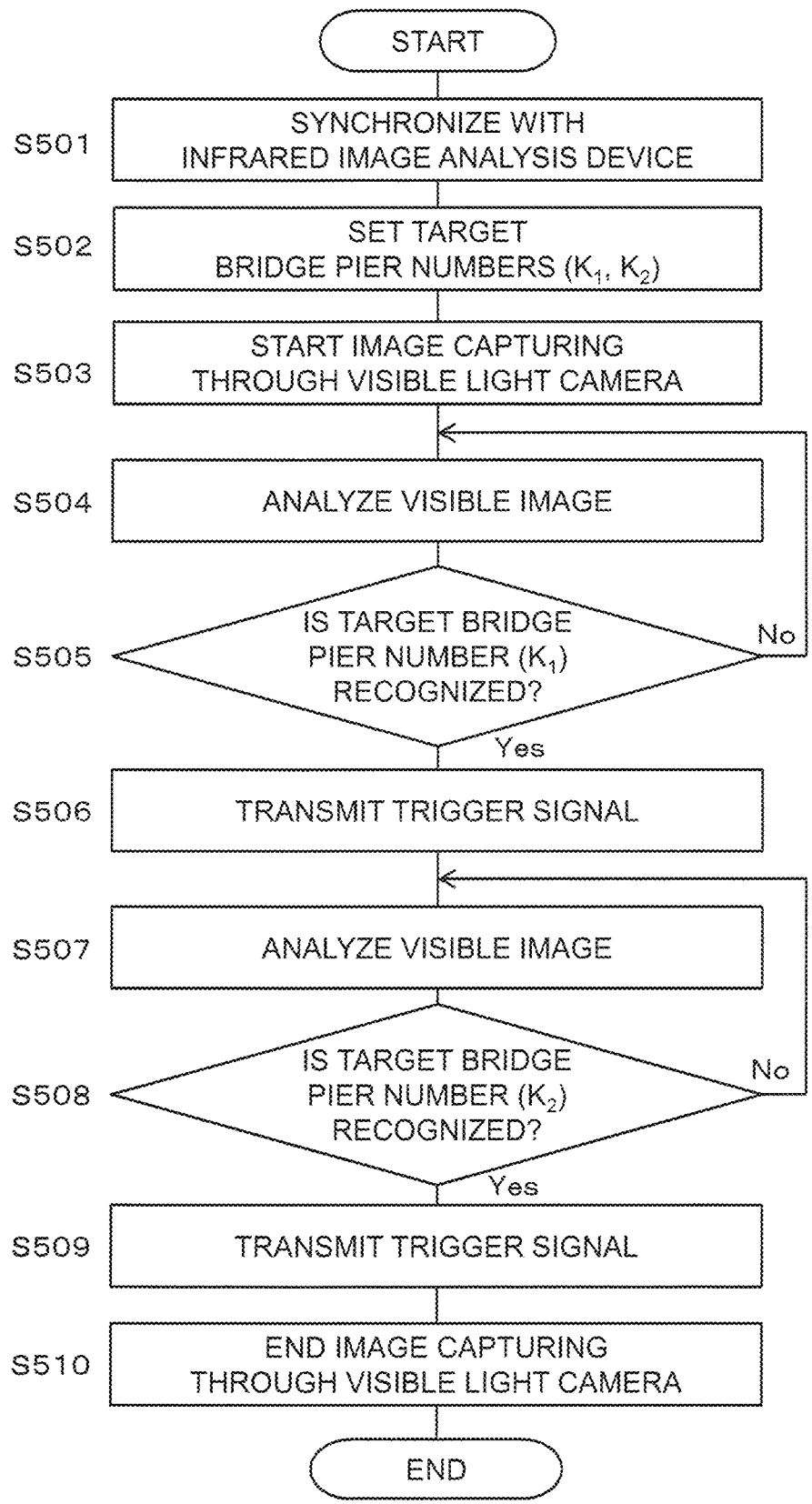

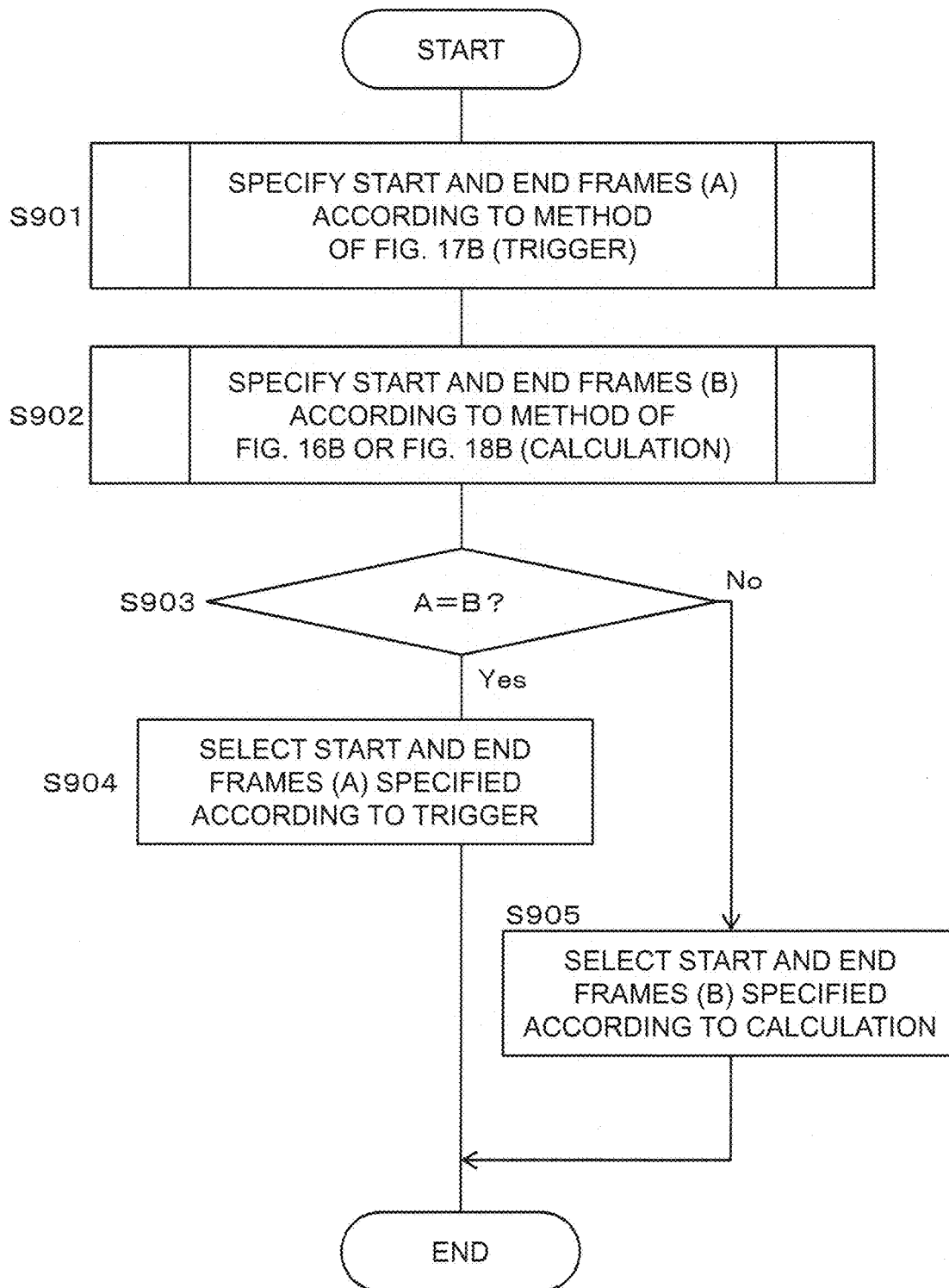

INFRARED IMAGE

TIME (FRAME)

STRESS DISTRIBUTION MEASUREMENT METHOD AND STRESS DISTRIBUTION MEASUREMENT SYSTEM

BACKGROUND

1. Technical Field

The present disclosure relates to a method and a system that measure stress distribution generated on a structural object such as an expressway bridge when a moving object such as a vehicle moves along the structural object.

2. Related Art

JP 2008-232998 A, JP 4803652 B, and JP 4367932 B each disclose a structural-object stress variation distribution measurement method of measuring stress variation distribution (stress distribution) on a structural object such as a bridge to which stress variation occurs due to a moving load or the like. The stress variation distribution measurement method employs an infrared thermography using an infrared camera. The infrared thermography measures, through the infrared camera, energy distribution of infrared emitted from the surface of an object, and generates an image by converting the measured energy distribution into temperature distribution. Accordingly, the stress variation distribution measurement method measures variation distribution of stress acting on the object by measuring minute temperature variation, in other words, thermoelastic temperature variation occurring in the object when the object elastically deforms.

SUMMARY

The present disclosure provides a stress distribution measurement method and a stress distribution measurement system that are capable of improving the accuracy of measuring stress distribution generated on a structural object when a moving object moves along the structural object.

A stress distribution measurement method according to the present disclosure measures stress distribution generated on a structural object including two support parts and a beam part provided between the support parts when a moving object moves along the structural object. The method includes: generating first image data by performing, through a first image capturing unit, image capturing of the moving object moving between the support parts or an identification display object attached to the structural object from the moving object; calculating, based on the first image data, a movement duration in which the moving object moves between the support parts of the structural object; generating, as second image data, thermal image data in accordance with temperature at a surface of the beam part by performing image capturing of the surface of the beam part of the structural object through a second image capturing unit; calculating a temperature change amount based on second image data group corresponding to a movement duration in the second image data; and calculating a stress change amount based on the temperature change amount to calculate stress distribution generated on the surface of the beam part of the structural object based on the stress change amount.

A stress distribution measurement system according to the present disclosure measures stress distribution generated on a structural object including two support parts and a beam part provided between the support parts when a moving object moves along the structural object. The system includes: a first image capturing unit configured to generate first image data by performing image capturing of the moving object moving between the support parts or an identification display object attached to the structural object from the moving object; a second image capturing unit configured to generate, as second image data, thermal image data in accordance with temperature at a surface of the beam part by performing image capturing of the surface of the beam part of the structural object; a first calculation unit configured to calculate, based on the first image data, a movement duration in which the moving object moves between the support parts of the structural object; a second calculation unit configured to calculate a temperature change amount based on a second image data group corresponding to a movement duration in the second image data; and a third calculation unit configured to calculate a stress change amount based on the temperature change amount and calculate stress distribution generated on the surface of the beam part of the structural object based on the stress change amount.

Stress distribution measurement method and system according to the present disclosure are capable of improving the accuracy of measuring stress distribution generated on a structural object when a moving object moves along the structural object.

BRIEF DESCRIPTION OF DRAWINGS

FIG. 7A is a diagram illustrating the configuration of vehicle weight information managed by a toll terminal according to Embodiment 2.

FIG. 7B is a diagram illustrating the configuration of a stress distribution database managed by the server according to Embodiment 2.

FIG. 10 is a diagram illustrating a bridge structure for which the stress distribution illustrated in FIGS. 9A and 9B is measured.

FIG. 17A is a flowchart for description of a frame specifying operation performed by a visible image analysis device according to Embodiment 4 during image capturing.

FIG. 19 is a flowchart for description of a frame specification operation performed by an infrared image analysis device according to Embodiment 6 by a plurality of methods.

DETAILED DESCRIPTION OF PREFERRED EMBODIMENTS

Figure 1:
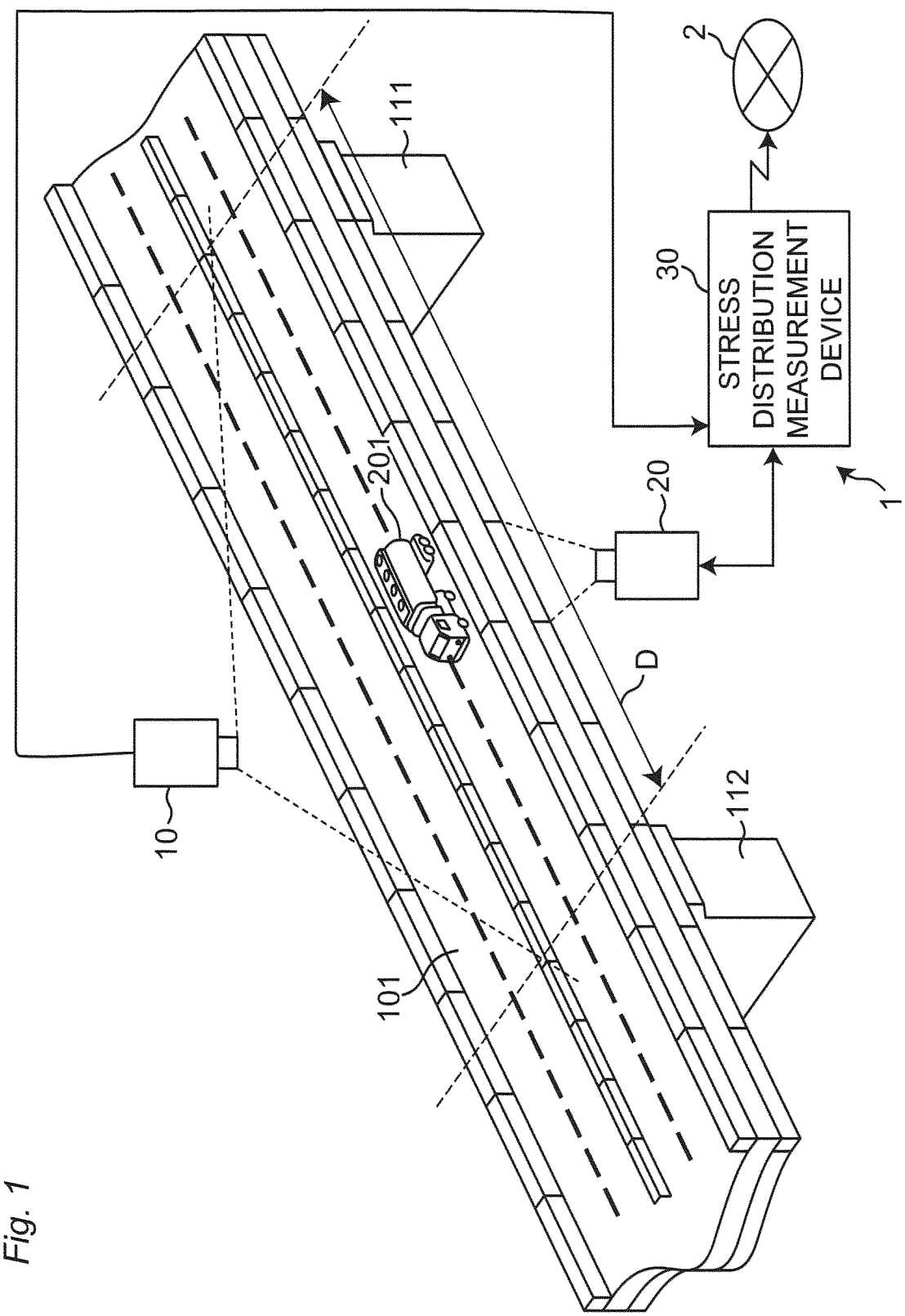
FIG. 1 is a diagram illustrating the configuration of a stress distribution measurement system according to Embodiment 1.

Embodiments will be described below in detail with reference to the accompanying drawings as appropriate. However, any unnecessarily detailed description thereof will be omitted in some cases. For example, detailed description of an already well-known matter and duplicate description of substantially identical components will be omitted in some cases. This is to avoid unnecessary redundancy of the following description and facilitate understanding of the skilled person in the art. In addition, the inventor(s) provides the accompanying drawings and the following description to allow those skilled in the art to sufficiently understand the present disclosure, which are not intended to limit the claimed subject matter.

Background of Present Disclosure

Methods of measuring stress distribution generated on a bridge on an expressway or the like when a vehicle travels on the bridge include a method of employing an infrared thermography by using an infrared camera. This method performs image capturing of a bridge through an infrared camera when a vehicle travels on the bridge, and generates thermal image data in accordance with temperature at the surface of the bridge. Then, this method calculates a temperature change amount based on the thermal image data, and calculates a stress change amount based on the temperature change amount, thereby measuring stress distribution.

This stress distribution measurement method measures the thermal image data when the vehicle passes through a certain interval including a measurement region of the bridge, and calculates the temperature change amount based on the thermal image data. The inventor of the present application has found that the calculated temperature change amount varies in experiments performed by this method with different intervals through which the vehicle passes when the thermal image data is measured.

In this regard, the inventor of the present application has found that a most correct temperature change amount is a temperature change amount calculated based on thermal image data measured for a duration in which a vehicle travels through an interval between two adjacent bridge piers of a bridge.

Based on this finding, a stress distribution measurement method according to the present disclosure performs, through a visible light camera, image capturing of a vehicle traveling between two adjacent bridge piers, and calculates a travel duration in which the vehicle travels through an interval D between the bridge piers. Then, the stress distribution measurement method according to the present disclosure calculates a temperature change amount based on thermal image data obtained by performing image capturing through the infrared camera for the travel duration, and calculates a stress change amount based on the temperature change amount, thereby measuring stress distribution.

Embodiment 1

The following describes a stress distribution measurement system according to Embodiment 1 with reference to FIGS. 1 to 4.

[1-1. Configuration]

[1-1-1. Stress Distribution Measurement System]

FIG. 1 is a diagram illustrating the configuration of the stress distribution measurement system according to Embodiment 1. The stress distribution measurement system 1 illustrated in FIG. 1 measures stress distribution generated on an expressway bridge 101 when a vehicle 201 travels on the bridge 101. The stress distribution measurement system 1 includes a visible light camera (first image capturing unit) 10, an infrared camera (second image capturing unit) 20, and a stress distribution measurement device 30.

The stress distribution measurement system 1 measures thermal image data when the vehicle 201 travels through a predetermined interval (hereinafter referred to as a "measurement interval") D on a road on the bridge 101, and calculates stress distribution based on the thermal image data. In particular, the measurement interval D is set to be an interval between two adjacent bridge piers 111 and 112 on the road on the bridge 101.

The visible light camera 10 is disposed above the bridge 101. The visible light camera 10 generates visible image data (first image data) by performing, at a predetermined frame rate (for example, 100 Hz or 100 per second), image capturing of the vehicle 201 traveling on the road on the bridge 101 between the two adjacent bridge piers 111 and 112.

The infrared camera 20 is disposed below the bridge 101. The infrared camera 20 includes a plurality of pixels, and generates thermal image data (second image data) in accordance with temperature in a predetermined region on the lower surface of the bridge 101 between the bridge piers 111 and 112 by performing image capturing of the predetermined region on the lower surface of the bridge 101 at a predetermined frame rate (for example, 100 Hz or 100 per second).

The stress distribution measurement device 30 specifies, based on the visible image data from the visible light camera 10, a duration (movement duration) in which the vehicle 201 travels through the interval D from the bridge pier 111 to the bridge pier 112. Then, the stress distribution measurement device 30 measures stress distribution generated on the bridge 101 based on thermal image data obtained by image capturing through the infrared camera 20 in the specified duration. The stress distribution measurement device 30 transmits data of the measured stress distribution to a server or the like through the Internet 2. The following describes the configuration of the stress distribution measurement device 30.

[1-1-2. Stress Distribution Measurement Device]

Figure 2:
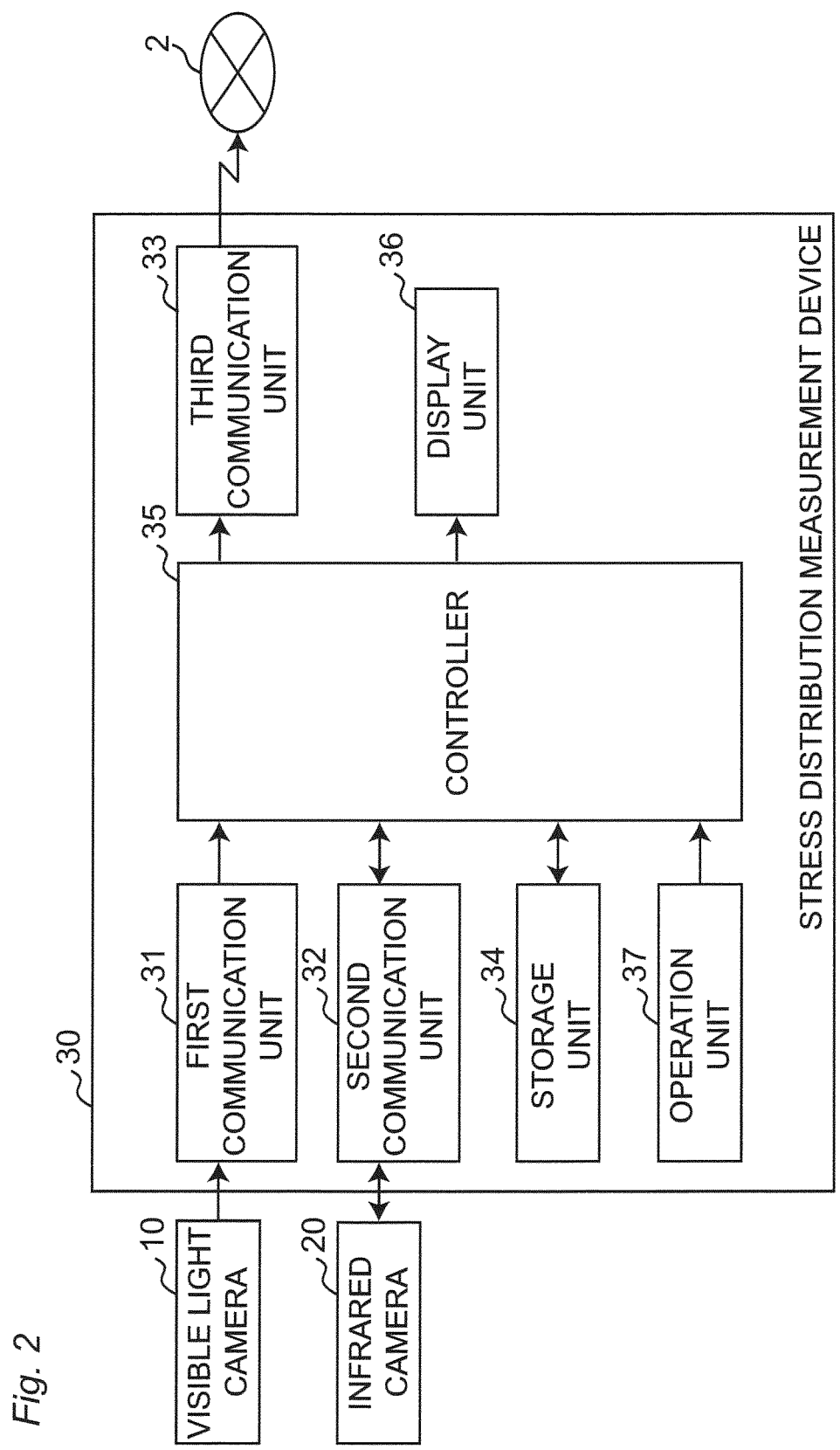
FIG. 2 is a diagram illustrating the configuration of a stress distribution measurement device according to Embodiment 1.

FIG. 2 is a diagram illustrating the configuration of the stress distribution measurement device according to Embodiment 1. The stress distribution measurement device 30 illustrated in FIG. 2 is achieved by, for example, a computer. The stress distribution measurement device 30 includes first to third communication units 31, 32, and 33, a storage unit 34, a controller 35, a display unit 36, and an operation unit 37.

The first and second communication units 31 and 32 each include communication interfaces such as USB and HDMI. The first communication unit 31 is an input unit through which the visible image data obtained by image capturing at the predetermined frame rate is sequentially input from the visible light camera 10.

The second communication unit 32 is an input unit through which the thermal image data obtained by image capturing at the predetermined frame rate is sequentially input from the infrared camera 20. The second communication unit 32 receives, from the controller 35, control information related to operations to, for example, start and end image capturing through the infrared camera 20, and transmits the received control information to the infrared camera 20.

The third communication unit 33 includes a wireless communication interface compliant with communication standards such as IEEE 802.11, 3G, and LTE. The third communication unit 33 connects the controller 35 to the Internet 2.

The storage unit 34 is a recording medium including, for example, a HDD or a SSD. The storage unit 34 stores the visible image data obtained by image capturing through the visible light camera 10 and received through the first communication unit 31. The storage unit 34 stores the thermal image data obtained by image capturing through the infrared camera 20 and received through the second communication unit 32. The storage unit 34 also stores a reference value input from the operation unit 37 to be described later and needed to detect that the vehicle 201 is positioned on each of the bridge piers 111 and 112. The storage unit 34 also stores various computer programs for the controller 35.

The controller 35 is achieved by a CPU, an MPU, or the like, and controls the entire stress distribution measurement device 30 by executing the various computer programs stored in the storage unit 34. The controller 35 controls operations to, for example, start and stop image capturing through the infrared camera 20. The controller 35 specifies a duration (timing) in which the vehicle 201 travels through the interval D from the bridge pier 111 to the bridge pier 112 based on the visible image data from the visible light camera 10. Then, the controller 35 measures the stress distribution generated on the bridge 101 based on the thermal image data obtained by image capturing through the infrared camera 20 in the specified duration (timing). The controller 35 transmits data of the measured stress distribution to a server or the like through the Internet 2. In this case, the controller 35 functions as first to third calculation units. These functions will be described in detail in operation description later.

The display unit 36 is achieved by, for example, a liquid crystal display or an organic EL display, and displays the stress distribution obtained by the controller 35 as, for example, color information or gradation information.

The operation unit 37 includes, for example, a keyboard, a touch panel, and a button. The operation unit 37 is a device operated by a user when a reference value needed to detect that the vehicle 201 passes through each of the bridge piers 111 and 112 is set.

[1-2. Operation]

The following describes operations of the stress distribution measurement system 1 configured as described above. The description will be made of a stress distribution measurement operation performed by the controller 35 of the stress distribution measurement device 30 according to Embodiment 1 with reference to the flowchart illustrated in FIG. 3. For the purpose of illustration, the following description assumes that the single vehicle 201 passes through the measurement interval D from the bridge pier 111 to the bridge pier 112 on a driving lane among two downbound lanes (or upbound lanes) of the bridge 101.

Figure 3:
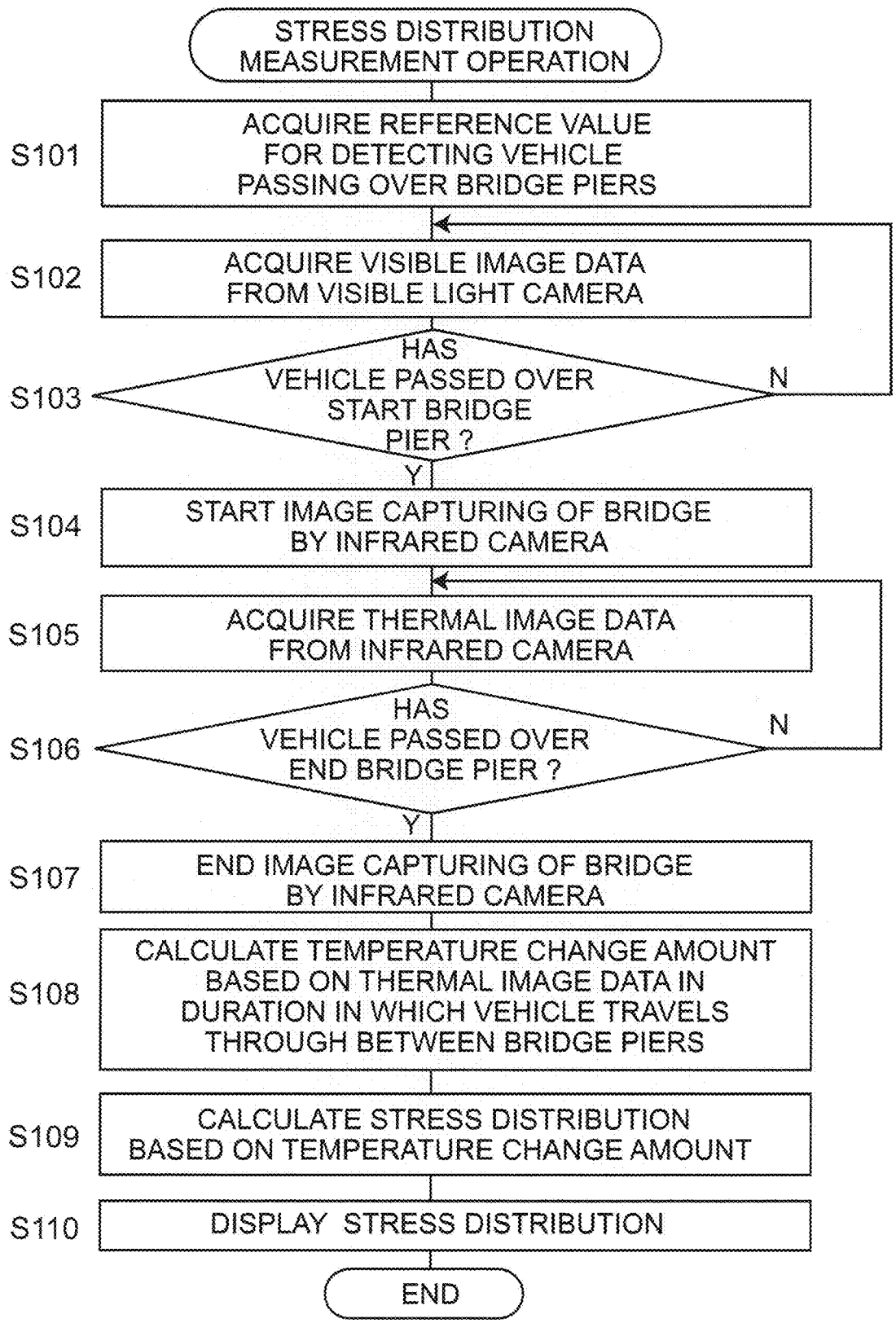
FIG. 3 is a diagram illustrating a stress distribution measurement operation performed by a controller of the stress distribution measurement device according to Embodiment 1.

As illustrated in FIG. 3, first, the controller 35 acquires a reference value for detecting that the vehicle 201 passes over the bridge piers 111 and 112 (S101). The reference value is, for example, a value indicating the front glass size of the vehicle 201 when the vehicle 201 is positioned on each of the bridge piers 111 and 112. The size of the front glass as the reference value may be an average value over the front glass sizes of a plurality of car types or may be the size of the front glass of a representative car type. The reference value is input through the operation unit 37 by the user, and stored in the storage unit 34 in advance.

The front glass size does not largely differ between car types. For example, the size of the front glass of a large-size vehicle is not much larger than the size of the front glass of a small-size vehicle. Thus, in the present embodiment, the front glass size is used to detect that the vehicle 201 passes over the bridge piers 111 and 112.

Subsequently, the controller 35 acquires, from the visible light camera 10, visible image data obtained by image capturing of the vehicle 201 traveling on the bridge 101 (S102). The acquired visible image data is temporarily stored in the storage unit 34.

Subsequently, the controller 35 performs image analysis of the visible image data to determine whether the vehicle has passed over the bridge pier 111 as the starting point of the measurement interval D (S103). For example, the controller 35 performs the vehicle detection through image analysis of the visible image data. When the vehicle 201 is detected and the front glass size of the vehicle 201 determined through the image analysis is in a predetermined range centered at the front glass size as the reference value, the controller 35 determines that the vehicle 201 has passed over the bridge pier 111.

When the vehicle has not passed over the bridge pier 111 yet, the controller 35 repeats the above-described processing at steps S102 and S103 until the vehicle passes over the bridge pier 111.

When having detected that the vehicle 201 has passed over the bridge pier 111 at step S103, the controller 35 controls the infrared camera 20 to start image capturing of the lower surface of the bridge 101 (S104). Then, the controller 35 acquires thermal image data in accordance with temperature at the lower surface of the bridge 101 from the infrared camera 20 (S105). The acquired thermal image data is stored in the storage unit 34.

Subsequently, the controller 35 performs image analysis of the visible image data from the visible light camera 10 to determine whether the vehicle has passed over the bridge pier 112 as the end point of the measurement interval D (S106). For example, the controller 35 determines whether the vehicle 201 has passed over the bridge pier 112 based on the front glass size of the vehicle 201 determined through the image analysis.

When the vehicle has not passed over the bridge pier 112 yet, the controller 35 repeats the above-described processing at steps S105 and S106 until the vehicle passes over the bridge pier 112.

When having detected that the vehicle 201 has passed over the bridge pier 112 as the end point at step S106, the controller 35 controls the infrared camera 20 to end image capturing of the lower surface of the bridge 101 (S107), and ends the thermal image data acquisition from the infrared camera 20.

In this manner, the controller 35 acquires thermal image data for the duration in which the vehicle 201 travels through the measurement interval D from the bridge pier 111 to the bridge pier 112.

Subsequently, the controller 35 calculates, as a temperature change amount, the temporal change amount of temperature for each pixel based on the thermal image data acquired in the duration in which the vehicle 201 travels through the measurement interval D (S108). For example, the controller 35 calculates the temperature change amount through Fourier transform of the thermal image data.

Subsequently, the controller 35 calculates stress distribution based on the calculated temperature change amount (S109). Specifically, the controller 35 first calculates, as a stress change amount, the temporal change amount of stress for each pixel based on the temperature change amount. For example, the controller 35 calculates a stress change amount $\Delta\delta$ from a temperature change amount $\Delta T$ by using an expression below of a thermoelastic effect.

$$\Delta T = -KT\Delta\delta \quad (1)$$

In the expression, K represents a thermoelastic coefficient given by $K=\alpha/(\rho C_P)$, and T represents the absolute temperature of the bridge. In addition, $\alpha$ represents the linear expansion coefficient of the bridge, $\rho$ represents the density of the bridge, and $C_P$ represents a specific heat under constant stress.

Then, the controller 35 calculates stress distribution based on the stress change amounts of all pixels.

The controller 35 stores the calculated stress distribution data in the storage unit 34, and displays the calculated stress distribution data on the display unit 36 (S9). This ends the stress distribution measurement operation. The controller 35 may transmit data of the stress distribution to a server or the like through the third communication unit 33 and the Internet 2.

Figure 4:
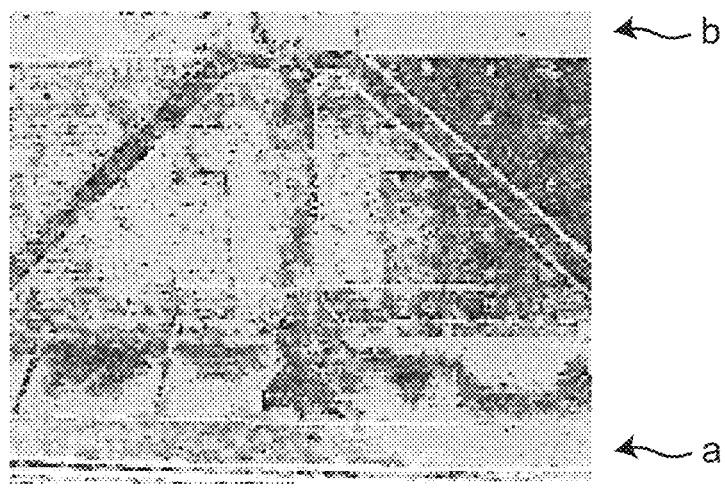
FIG. 4 is a diagram illustrating exemplary display of a stress distribution measurement result on a display unit of the stress distribution measurement device according to Embodiment 1.

FIG. 4 is a diagram illustrating exemplary display of a stress distribution measurement result to be displayed on the display unit 36. FIG. 4 illustrates a gray scale of stress distribution on the lower surface of a driving lane when the vehicle 201 travels on the driving lane, not a passing lane, as illustrated in FIG. 1. Part "a" corresponds to a beam (steel beam) positioned near the center of the driving lane, and Part "b" corresponds to a beam (steel beam) positioned between the driving lane and the passing lane. In FIG. 4, a gray part indicates generation of elongational stress, and a black part indicates generation of compressional stress. In this manner, the controller 35 may display stress distribution as color information in, for example, gray scale or color, or as gradation information.

[1-3. Effects]

As described above, in the present embodiment, the stress distribution measurement method measures stress distribution generated on the bridge 101 when the vehicle 201 travels on the bridge 101. The stress distribution measurement method includes: the step (S102) of generating visible image data by performing, through the visible light camera 10, image capturing of the vehicle 201 traveling between the bridge piers 111 and 112; the step (S103, S106) of calculating the duration (timing) in which the vehicle 201 travels between the bridge piers 111 and 112 based on the visible image data; the step (S105) of generating thermal image data in accordance with temperature at the surface of the bridge 101 by performing image capturing of the surface of the bridge 101 through the infrared camera 20; the step (S108) of calculating a temperature change amount based on a thermal image data group corresponding to the duration in the thermal image data; and the step (S109) of calculating a stress change amount based on the temperature change amount to calculate stress distribution generated on the surface of the bridge 101 based on the stress change amount.

In the present embodiment, the stress distribution measurement system 1 measures stress distribution generated on the bridge 101 when the vehicle 201 travels on the bridge 101. The system 1 includes the visible light camera 10, the infrared camera 20, and the controller (the first to third calculation units) 35. The visible light camera 10 generates visible image data by performing image capturing of the vehicle 201 traveling between the bridge piers 111 and 112. The infrared camera 20 generates thermal image data in accordance with temperature at the surface of the bridge 101 by performing image capturing of the surface of the bridge 101. The controller 35 calculates, based on the visible image data, the duration (timing) in which the vehicle 201 travels between the bridge piers 111 and 112. The controller 35 calculates a temperature change amount based on a thermal image data group corresponding to the duration in the thermal image data. The controller 35 calculates a stress change amount based on the temperature change amount, and calculates stress distribution generated on the surface of the bridge 101 based on the stress change amount.

As described above, in the present embodiment, stress distribution is calculated by determining, through the visible light camera 10, the duration in which the vehicle 201 travels between the two adjacent bridge piers 111 and 112 on the bridge 101 on an expressway or the like, calculating a temperature change amount based on thermal image data obtained by image capturing in the duration, to calculate a stress change amount based on the temperature change amount. Accordingly, the accuracy of measuring stress distribution generated on the bridge 101 when the vehicle 201 travels on the bridge 101 can be improved.

Embodiment 2

In Embodiment 1, stress distribution generated on a bridge on an expressway or the like when a vehicle travels on the bridge is measured. In Embodiment 2, data of the stress distribution measured in Embodiment 1 is managed in association with weight information of the vehicle.

The following describes a stress distribution measurement system according to Embodiment 2 with reference to FIGS. 5 to 10.

Figure 5:
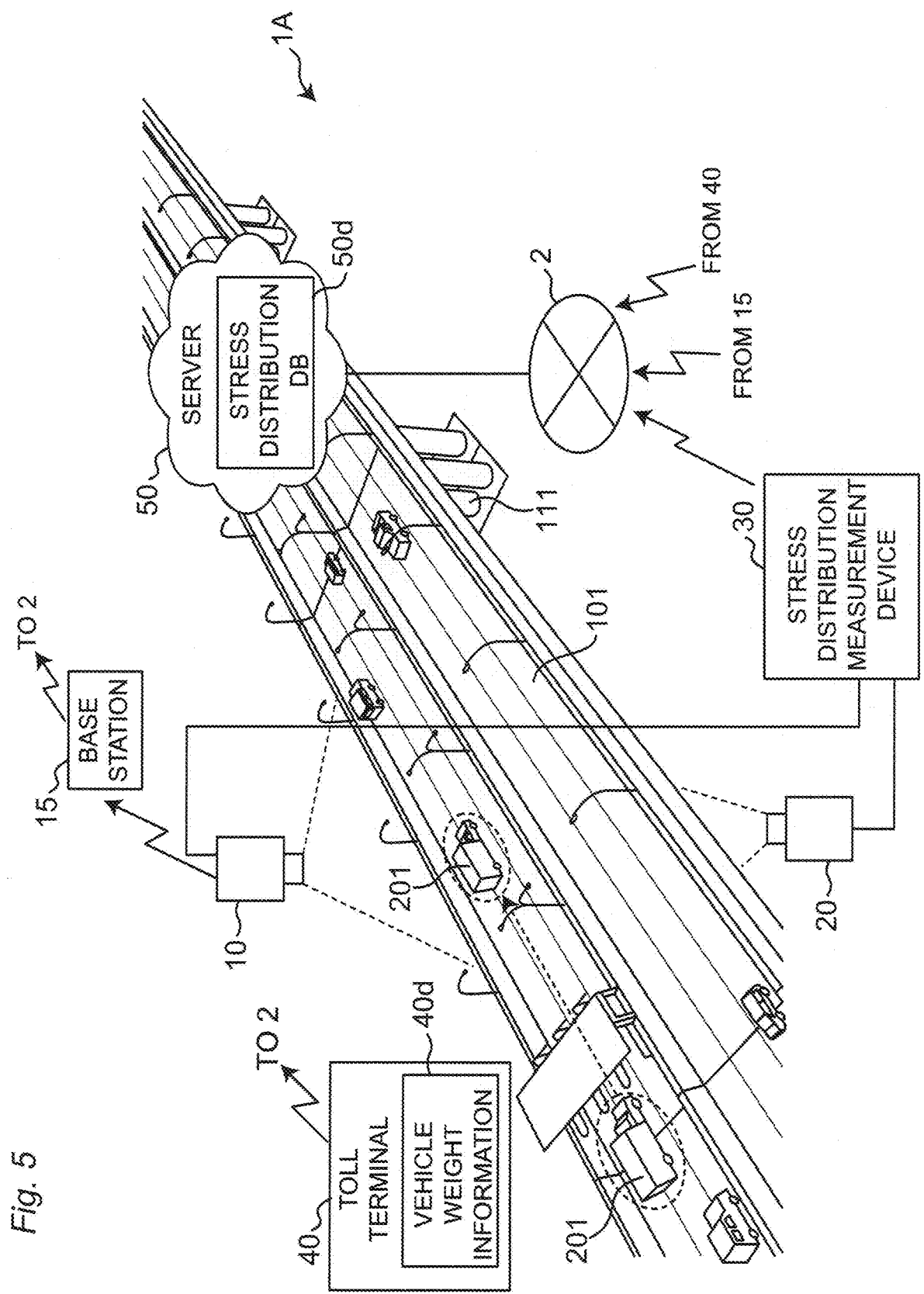
FIG. 5 is a diagram illustrating the configuration of a stress distribution measurement system according to Embodiment 2.

FIG. 5 is a diagram illustrating the configuration of the stress distribution measurement system according to Embodiment 2. A stress distribution measurement system 1A illustrated in FIG. 5 further includes a base station 15, a toll terminal 40, and a server 50 in addition to the configuration of the stress distribution measurement system 1 according to Embodiment 1 illustrated in FIG. 1.

The base station 15 is, for example, a base station of a 5 GHz wireless access system. The base station 15 communicates with the visible light camera 10 in accordance with a communication scheme such as Wi-Fi. The base station 15 connects to the Internet 2 in accordance with a communication scheme such as IEEE 802.11. The base station 15 receives, from the visible light camera 10, visible image data obtained by image capturing of the vehicle 201 traveling on the bridge 101 on an expressway, and transmits the received visible image data to the server 50 through the Internet 2.

The toll terminal 40 is disposed at a toll of an expressway or the like. The toll terminal 40 manages vehicle weight information 40$d$ in which a vehicle number acquired when the vehicle 201 passes through the toll is associated with the weight of the vehicle (FIG. 7A). The vehicle number is identified by performing, for example, image analysis of an image obtained by capturing the vehicle through a visible light camera or the like. The vehicle weight is measured by, for example, a vehicle axle load measurement device. The toll terminal 40 connects to the Internet 2 in accordance with a communication scheme such as IEEE 802.11.

The server 50 is, for example, a cloud server, and connects to the Internet 2. The server 50 acquires stress distribution data from the stress distribution measurement device 30 through the Internet 2. The server 50 also acquires visible image data from the visible light camera 10 through the base station 15 and the Internet 2. The server 50 also acquires the vehicle weight information 40$d$ from the toll terminal 40 through the Internet 2. Based on the acquired stress distribution data, the acquired visible image data, and the acquired vehicle weight information 40$d$, the server 50 manages, as a stress distribution database 50$d$, the stress distribution data in association with the vehicle weight of the vehicle 201 traveling through the measurement interval D on the bridge 101 when the stress distribution data is measured (FIG. 7B). The following describes the configuration of the server 50.

Figure 6:
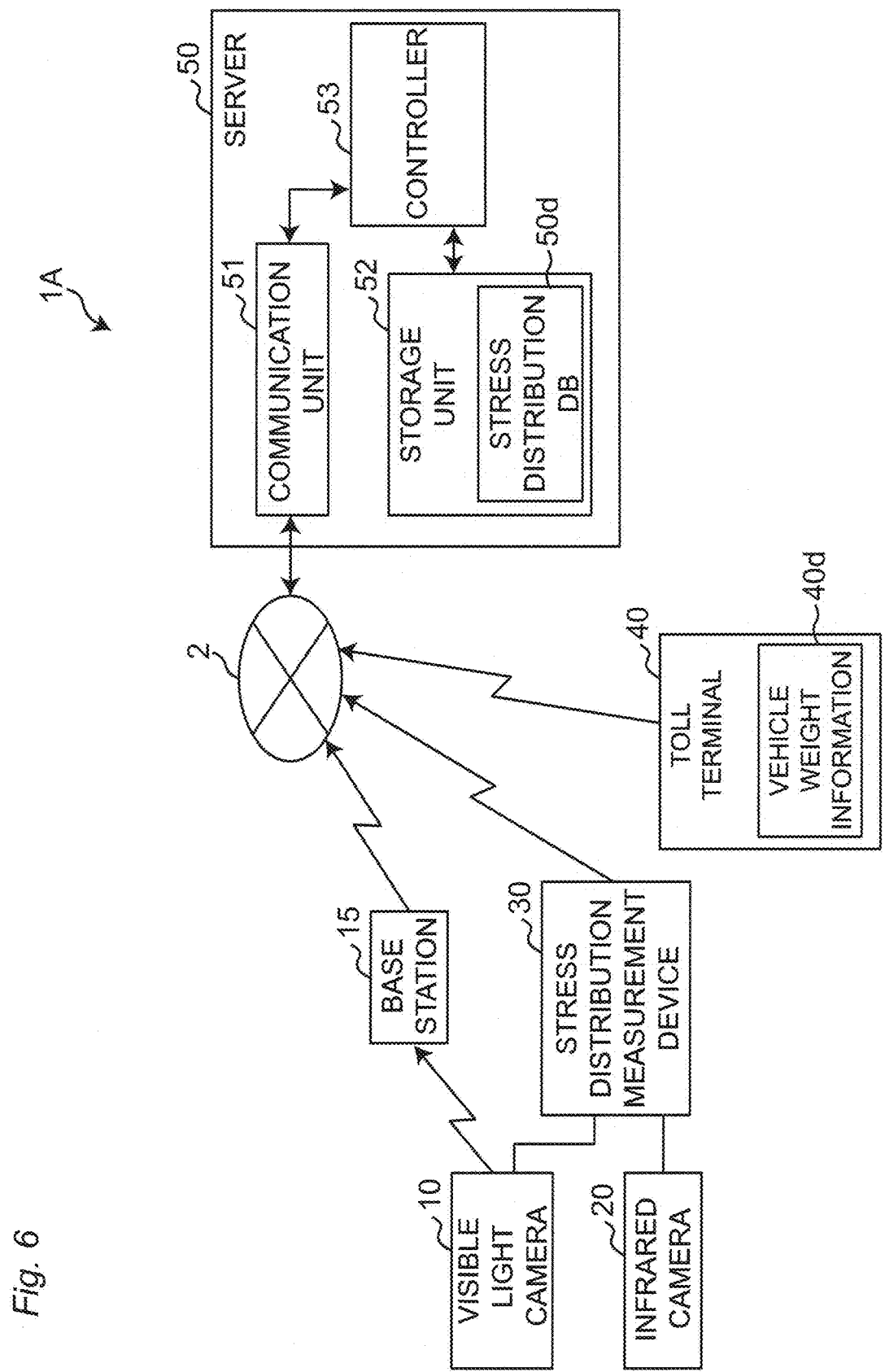
FIG. 6 is a diagram illustrating the configuration of a server according to Embodiment 2.

FIG. 6 is a diagram illustrating the configuration of the server 50 according to Embodiment 2. The server 50 illustrated in FIG. 6 is achieved by, for example, a computer. The server 50 includes a communication unit 51, a storage unit 52, and a controller 53.

The communication unit 51 includes a communication interface compliant with a communication standard such as IEEE 802. The communication unit 51 connects the controller 53 to the Internet 2.

The storage unit 52 is a recording medium including, for example, a HDD or a SSD. The storage unit 52 temporarily stores the stress distribution data, the visible image data, and the vehicle weight information 40$d$ received by the communication unit 51. The storage unit 52 also stores the stress distribution database 50$d$ associating the vehicle weight and the stress distribution data. The storage unit 52 also stores various computer programs for the controller 53.

FIG. 7A is a diagram illustrating the vehicle weight information 40$d$ stored in the storage unit 52, in other words, the vehicle weight information 40$d$ managed by the toll terminal, and FIG. 7B is a diagram illustrating the stress distribution database 50$d$ stored in the storage unit 52. The vehicle weight information 40$d$ is information associating the vehicle number and the vehicle weight as illustrated in FIG. 7A, and the stress distribution database 50$d$ is a database associating the vehicle number, the vehicle weight, and the stress distribution data as illustrated in FIG. 7B.

The controller 53 is achieved by a CPU, an MPU, or the like, and controls the entire server 50 by executing the various computer programs stored in the storage unit 52. The controller 53 specifies, based on the visible image data from the visible light camera 10, the vehicle number of the vehicle 201 traveling between the bridge piers on the bridge 101 when the stress distribution data is measured, and extracts the vehicle weight corresponding to the specified vehicle number based on the vehicle weight information from the toll terminal 40. The controller 53 manages, as a stress distribution database, the stress distribution data, the identified vehicle number, and the specified vehicle weight in association with each other.

Figure 8:
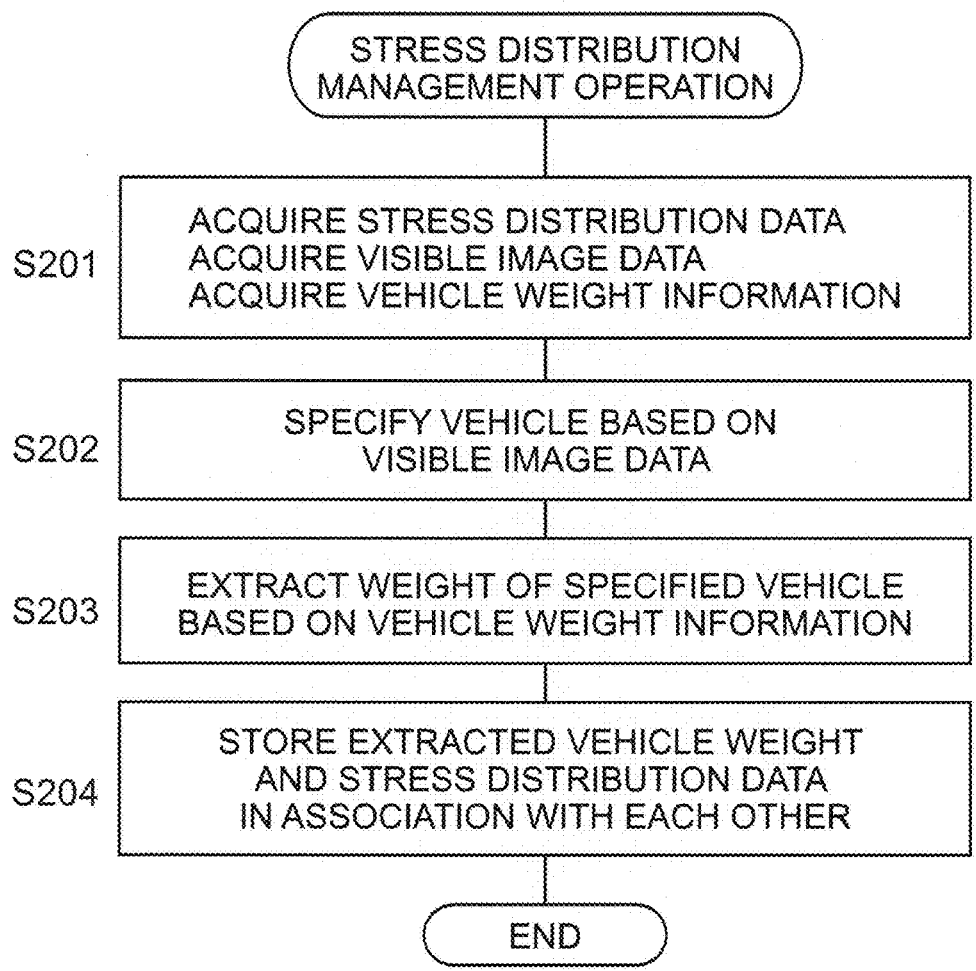
FIG. 8 is a diagram illustrating a stress distribution management operation by the server according to Embodiment 2.

The following describes a stress distribution data management operation performed by the controller 53 of the server 50 according to Embodiment 2 with reference to the flowchart illustrated in FIG. 8.

As illustrated in FIG. 8, the controller 53 of the server 50 first acquires the stress distribution data from the stress distribution measurement device 30 through the Internet 2 (S201). The controller 53 also acquires the visible image data from the visible light camera 10 through the Internet 2 (S201). The controller 53 also acquires the vehicle weight information from the toll terminal 40 through the Internet 2 (S201).

Subsequently, the controller 53 specifies the vehicle 201 traveling between the bridge piers on the bridge 101 when the stress distribution data is measured (S202). The controller 53 specifies the vehicle number of the vehicle 201 by performing image analysis by using visible image data in a past predetermined time among the visible image data for the specification.

Subsequently, the controller 53 extracts the vehicle weight corresponding to the specified vehicle number of the vehicle 201 based on the vehicle weight information associating vehicle numbers and vehicle weights, illustrated in FIG. 7A (S203).

Subsequently, as illustrated in FIG. 7B, the controller 53 stores, as a stress distribution database in the storage unit 52, the stress distribution data, the extracted vehicle weight, and the specified vehicle number in association with each other (S204). This ends the stress distribution management operation.

As described above, the present embodiment can achieve effects as follows in addition to the effects of Embodiment 1. In the present embodiment, data of stress distribution generated on the bridge 101 when the vehicle 201 travels on the bridge 101 can be accumulated in a stress distribution database in association with the vehicle weight and vehicle number of the vehicle 201. When the stress distribution database is used, only stress distribution needs to be measured to detect whether the vehicle 201 traveling between the bridge piers on the bridge 101 when the stress distribution data is measured is an overloaded vehicle.

Figure 9A:
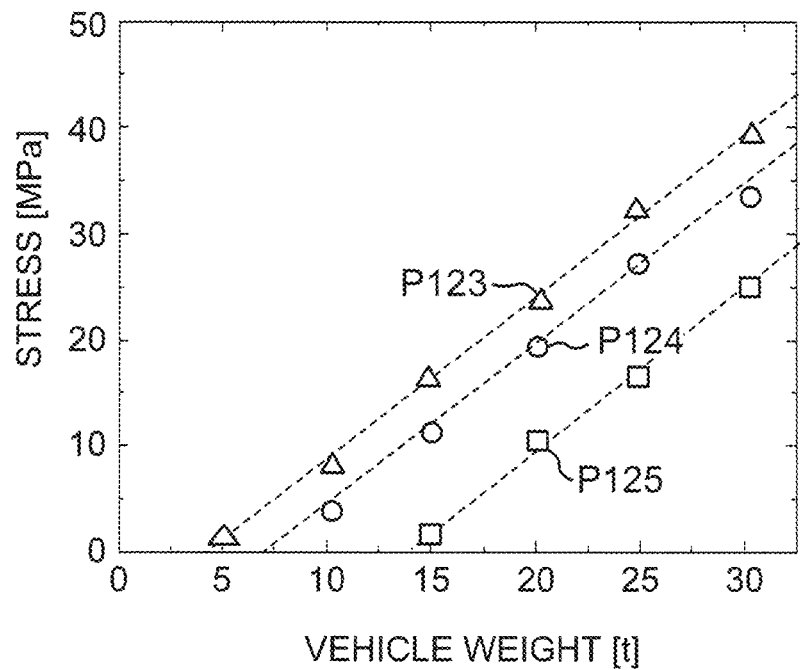
FIG. 9A is a diagram illustrating a relation between stress and the weight of a vehicle in stress distribution measured when the vehicle travels on a driving lane.
Figure 9B:
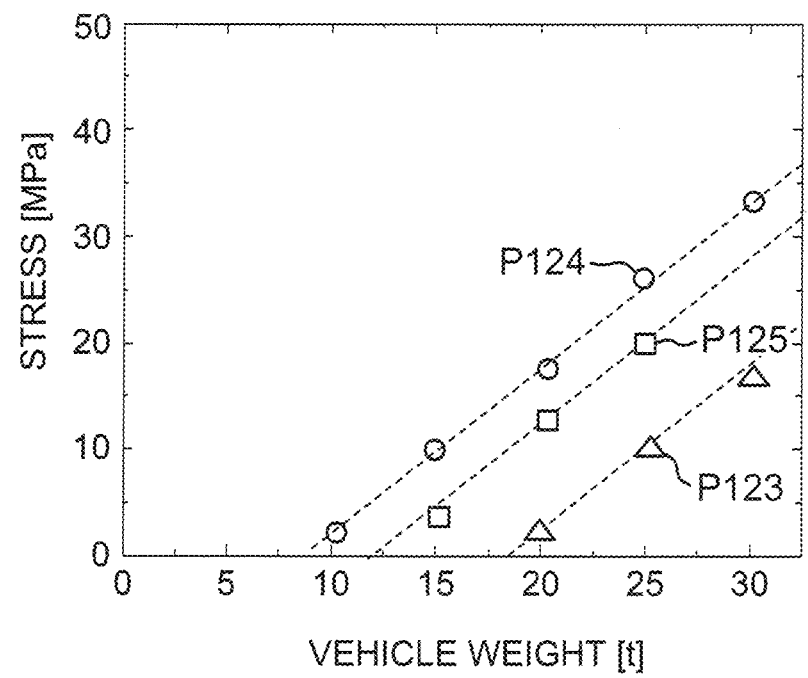
FIG. 9B is a diagram illustrating a relation between stress and the weight of a vehicle in stress distribution measured when the vehicle travels on a passing lane.

The following describes the relation between the stress distribution data and the vehicle weight in the stress distribution database with reference to FIGS. 9A and 9B. FIGS. 9A and 9B illustrate results of measurement of stress distribution on a bridge structure illustrated in FIG. 10.

The following description will be first made on the bridge structure illustrated in FIG. 10. The bridge 101 on an expressway or the like has a downbound lane 120 and an upbound lane 130. The downbound lane 120 has a driving lane 121 and a passing lane 122. A beam 123 supports a bridge part substantially at the center of the driving lane 121, a beam 124 supports a bridge part between the driving lane 121 and the passing lane 122, and a beam 125 supports a bridge part substantially at the center of the passing lane 122. The upbound lane 130 has a configuration same as that of the downbound lane 120, and thus description thereof will be omitted. FIGS. 9A and 9B illustrate stress distribution data obtained by image capturing of the lower surface of the downbound lane 120 through the infrared camera 20.

FIG. 9A is a diagram illustrating the relation between stress and the weight of the vehicle 201 in stress distribution measured when the vehicle 201 travels on the driving lane 121. FIG. 9B is a diagram illustrating the relation between stress and the weight of the vehicle 201 in stress distribution measured when the vehicle 201 travels the passing lane 122. In FIGS. 9A and 9B, each white triangle mark P123 represents stress generated on the beam 123, each white circular mark P124 represents stress generated on the beam 124, and each white rectangular mark P125 represents stress generated on the beam 125.

According to FIGS. 9A and 9B, the stress generated on the beams 123, 124, and 125 increases as the vehicle weight increases. Thus, only stress distribution needs to be measured to detect the weight of the vehicle 201 traveling between the bridge piers on the bridge 101 when the stress distribution data is measured, and detect whether the vehicle 201 is an overloaded vehicle.

In Embodiments 1 and 2, thermal image data is generated by performing image capturing through the infrared camera 20 only in the duration in which the vehicle passes through the measurement interval D. The present disclosure is not limited thereto. Thermal image data may be generated by constantly performing image capturing through the infrared camera 20, and thermal image data corresponding to the duration in which the vehicle passes through the measurement interval D may be extracted from the generated thermal image data. In this case, the controller may apply synchronized time stamps to the visible image data from the visible light camera and the thermal image data from the infrared camera, determine, from the visible image data, timings at which the vehicle passes through the bridge piers 111 and 112 as the starting and end points of the measurement interval D, and extract thermal image data based on the timings.

Figure 11:
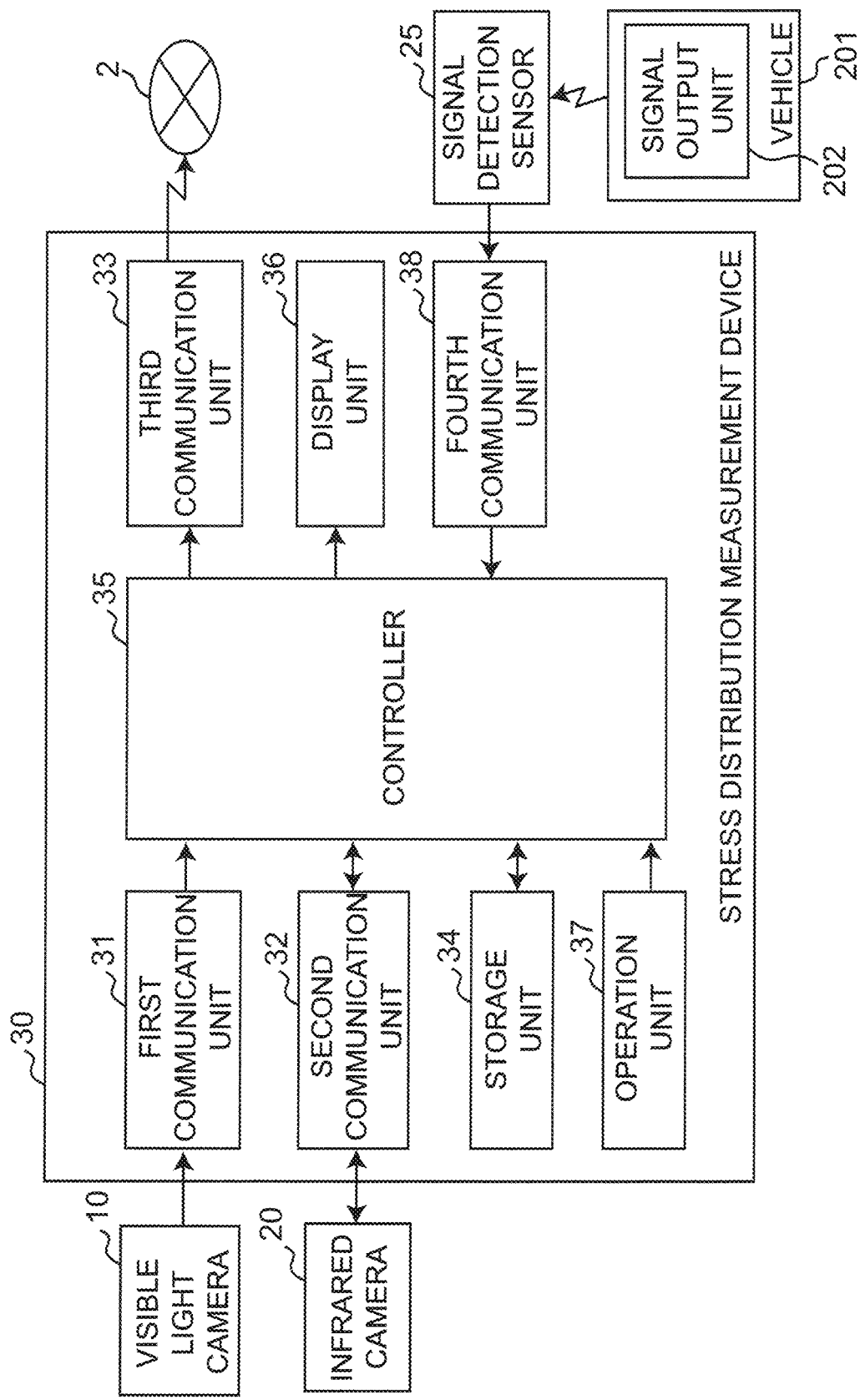
FIG. 11 is a diagram illustrating the configuration of a stress distribution measurement device according to a modification of Embodiments 1 and 2.

In Embodiments 1 and 2, the duration (timing) in which the vehicle 201 travels through the interval D from the bridge pier 111 to the bridge pier 112 is specified based on the visible image data from the visible light camera 10, and image capturing of thermal image data through the infrared camera 20 is performed in the specified duration (timing). The present disclosure is not limited thereto. Specification of the duration (timing) in which the vehicle travels the interval D between the bridge piers and image capturing of thermal image data through the infrared camera 20 may be started based on a sign or a signal from the vehicle. In this case, as illustrated in FIG. 11, the stress distribution measurement system may include a signal detection sensor 25 configured to receive a sign or a signal output from a signal output unit 202 in the vehicle 201, and the stress distribution measurement device 30 may include a fourth communication unit 38 configured to transmit the signal received by the signal detection sensor 25 to the controller 35. The sign or signal from the vehicle 201 may be a GPS signal, a beacon signal, or the like indicating the position of the vehicle, and the signal detection sensor 25 may be a sensor capable of receiving the GPS signal, the beacon signal, or the like from the vehicle 201.

Embodiment 3

In Embodiments 1 and 2, the visible light camera 10 is disposed above the bridge 101 as illustrated in FIG. 1, but the disposition position of the visible light camera 10 is not limited to a position above the bridge 101. The visible light camera 10 may be disposed at an optional position as long as thermal image data corresponding to the duration (movement duration) in which the vehicle 201 travels through the measurement interval D from the bridge pier 111 to the bridge pier 112 can be specified based on visible image data generated by the visible light camera 10. For example, the visible light camera 10 may be mounted on the vehicle 201. In a method described below, the visible light camera 10 is mounted on the vehicle 201, and the thermal image data corresponding to the duration of traveling through the measurement interval D is extracted based on the visible image data generated by the visible light camera 10.

A stress distribution measurement system according to the present embodiment specifies time information when the vehicle 201 passes through the starting and end points of the measurement interval D by performing image analysis during image capturing of a visible light image. Then, the stress distribution measurement system specifies start and end frames of thermal image data corresponding to the starting and end points of the measurement interval D based on the specified time information.

[3-1. Configuration]

Figure 12:
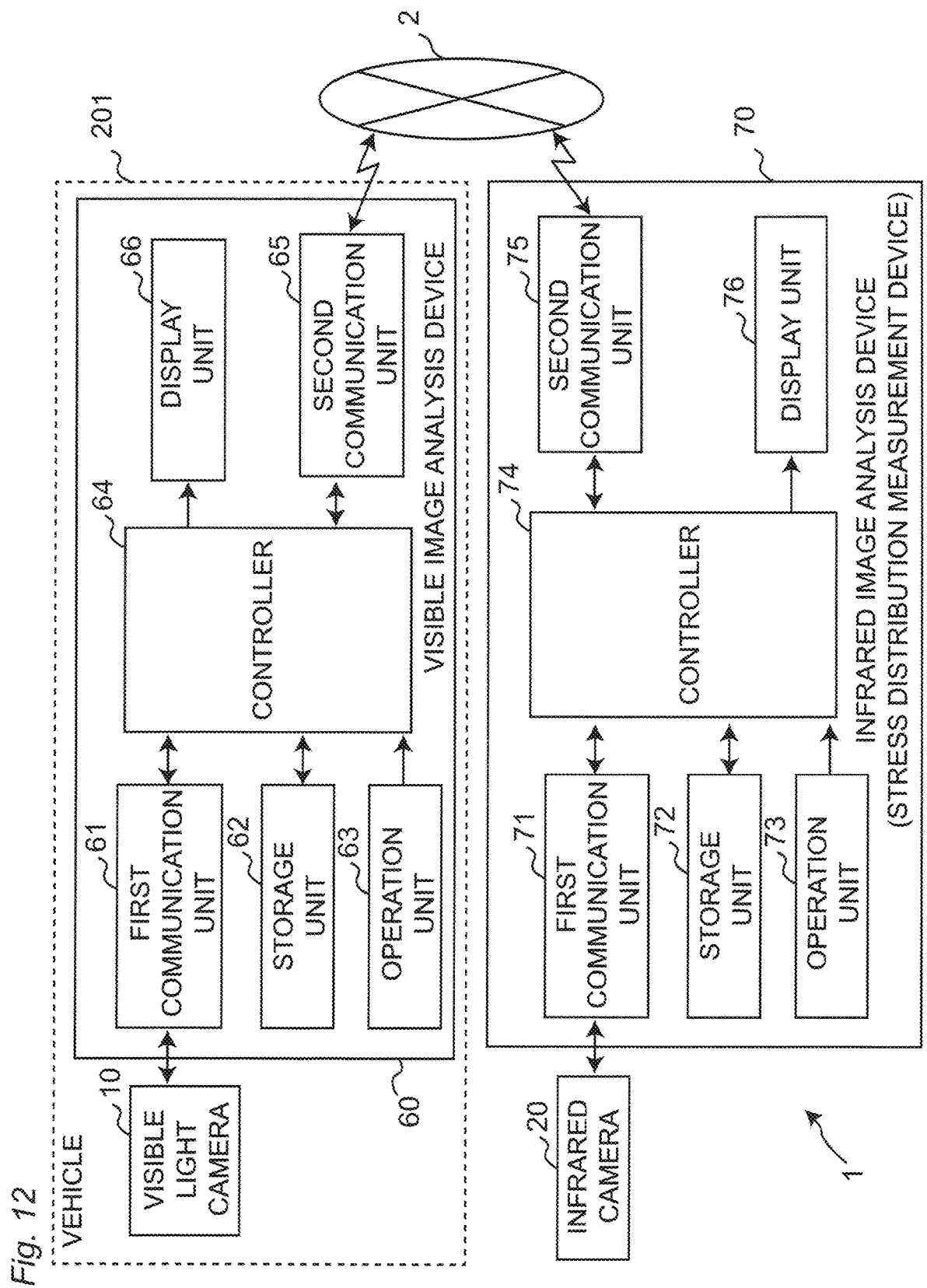
FIG. 12 is a diagram illustrating the configuration of a stress distribution measurement system according to Embodiments 3 to 6.

FIG. 12 is a diagram illustrating the configuration of the stress distribution measurement system according to Embodiment 3. The stress distribution measurement system 1 according to the present embodiment includes the visible light camera 10, a visible image analysis device 60 configured to analyze visible image data (first image data) generated by the visible light camera 10, the infrared camera 20, and an infrared image analysis device 70 configured to analyze thermal image data (infrared image data, second image data) generated by the infrared camera 20.

In particular, in the present embodiment, the visible light camera 10 is mounted on the vehicle 201 together with the visible image analysis device 60. The visible light camera 10 is fixed to the vehicle 201, for example, at a predetermined angle. The visible light camera 10 generates visible image data by performing image capturing of a sidewall on the bridge 101 at a predetermined frame rate (for example, 60 Hz or 60 per second) while the vehicle 201 is traveling.

The visible image analysis device 60 includes a first communication unit 61 configured to receive the visible image data generated by the visible light camera 10, a storage unit 62 configured to store the received visible image data, an operation unit 63, a controller 64 (first calculation unit) configured to analyze the visible image data, a second communication unit 65 for communication connection with the infrared image analysis device 70, and a display unit 66.

The first communication unit 61 includes communication interfaces such as USB and HDMI. The first communication unit 61 receives, from the controller 64, control information related to operations to, for example, start and end image capturing through the visible light camera 10, and transmits the received control information to the visible light camera 10. The first communication unit 61 also receives the visible image data generated by the visible light camera 10.

The storage unit 62 is a recording medium including, for example, a HDD or a SSD. The operation unit 63 is a device operated by the user, and includes, for example, a keyboard, a touch panel, and a button. For example, the user inputs an image capturing start instruction and an image capturing end instruction to the operation unit 63.

The controller 64 is achieved by a CPU, an MPU, or the like, and controls the entire visible image analysis device 60 by executing various computer programs stored in the storage unit 62. Specifically, the controller 64 controls operations to, for example, start and stop image capturing through the visible light camera 10. The controller 64 analyzes the visible image data generated by the visible light camera 10 to specify, from among a plurality of frames included in the visible image data, a frame (start frame) in which image capturing is performed on the bridge pier 111 as the starting point of the measurement interval D, and a frame (end frame) in which image capturing is performed on the bridge pier 112 as the end point of the measurement interval D. Then, the controller 64 acquires, from the specified frames, information indicating times at which the vehicle 201 passes through the bridge piers 111 and 112.

The second communication unit 65 includes a wireless communication interface compliant with communication standards such as IEEE 802.11, 3G, and LTE. The second communication unit 65 connects the controller 64 to the Internet 2. The controller 64 transmits, to the infrared image analysis device 70 through the second communication unit 65, information indicating the times at which the vehicle 201 passes through the bridge piers 111 and 112. The display unit 66 is achieved by, for example, a liquid crystal display or an organic EL display.

Similarly to Embodiment 1, as illustrated in FIG. 1, the infrared camera 20 is disposed below the bridge 101, and generates thermal image data (infrared image data) in accordance with temperature in a predetermined region on the lower surface of the bridge 101 between the bridge piers 111 and 112 by performing image capturing of the predetermined region on the lower surface of the bridge 101 at a predetermined frame rate (for example, 200 Hz or 200 per second).

The infrared image analysis device 70 includes a first communication unit 71 configured to receive the infrared image data generated by the infrared camera 20, a storage unit 72 configured to store the received infrared image data, an operation unit 73, a controller 74 (the first to third calculation units) configured to analyze the infrared image data, a second communication unit 75 for communication connection with the visible image analysis device 60, and a display unit 76.

The first communication unit 71 includes communication interfaces such as USB and HDMI. The first communication unit 71 receives, from the controller 74, control information related to operations to, for example, start and end image capturing through the infrared camera 20, and transmits the received control information to the infrared camera 20. The first communication unit 71 also receives the infrared image data generated by the infrared camera 20.

The storage unit 72 is a recording medium including, for example, a HDD or a SSD. The operation unit 73 is a device operated by the user, and includes, for example, a keyboard, a touch panel, and a button. For example, the user inputs an image capturing start instruction and an image capturing end instruction to the operation unit 73.

The controller 74 is achieved by a CPU, an MPU, or the like, and controls the entire infrared image analysis device 70 by executing various computer programs stored in the storage unit 72. Specifically, the controller 74 controls operations to, for example, start and stop image capturing through the infrared camera 20. The controller 74 specifies the start and end frames of the measurement interval D in the infrared image data based on the information acquired from the visible image analysis device 60 and indicating the times at which the vehicle 201 passes through the bridge piers 111 and 112.

The second communication unit 75 includes a wireless communication interface compliant with communication standards such as IEEE 802.11, 3G, and LTE. The second communication unit 75 connects the controller 74 to the Internet 2. The controller 74 receives, from the visible image analysis device 60 through the second communication unit 75, information indicating the times at which the vehicle 201 passes through the bridge piers 111 and 112. The display unit 76 is achieved by, for example, a liquid crystal display or an organic EL display.

Components (the first communication unit 71, the storage unit 72, the operation unit 73, the controller 74, the second communication unit 75, and the display unit 76) of the infrared image analysis device 70 according to the present embodiment are substantially identical to components (the second communication unit 32, the storage unit 34, the operation unit 37, the controller 35, the third communication unit 33, and the display unit 36) of the stress distribution measurement device 30 illustrated in FIG. 2 according to Embodiment 1. In the present embodiment, the infrared image analysis device 70 specifies the start and end frames of the measurement interval D in infrared image data and specifies a movement duration corresponding to the measurement interval D, and then, similarly to the stress distribution measurement device 30 according to Embodiment 1, measures stress distribution generated on the bridge 101 based on infrared image data in a movement duration in which image capturing is performed through the infrared camera 20.

[3-2. Operation]

[3-2-1. Overall Operation]

Figure 13A:
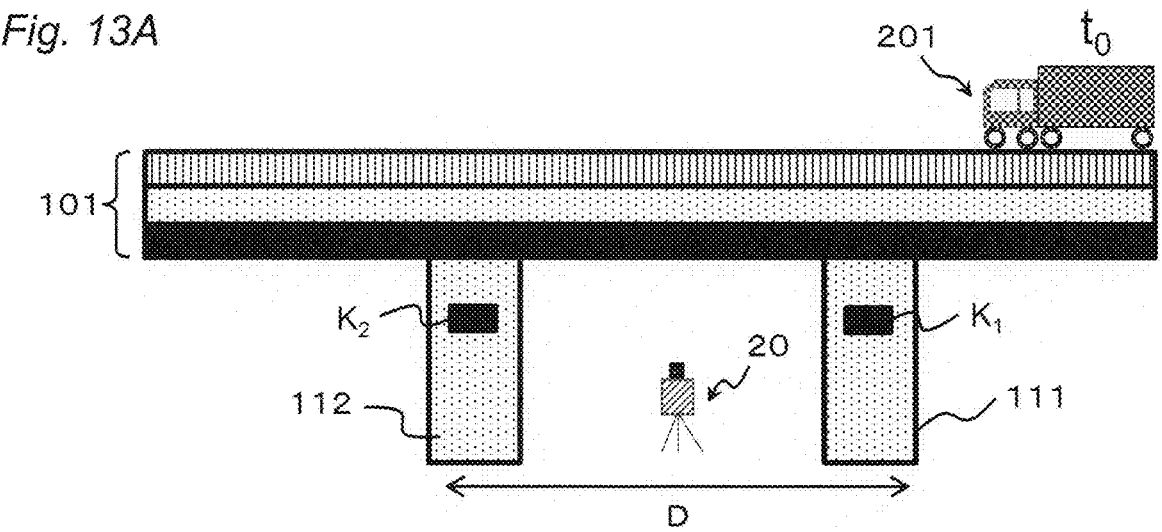
FIG. 13A is a diagram for description of measurement interval image capturing according to Embodiments 3 to 6.
Figure 13B:
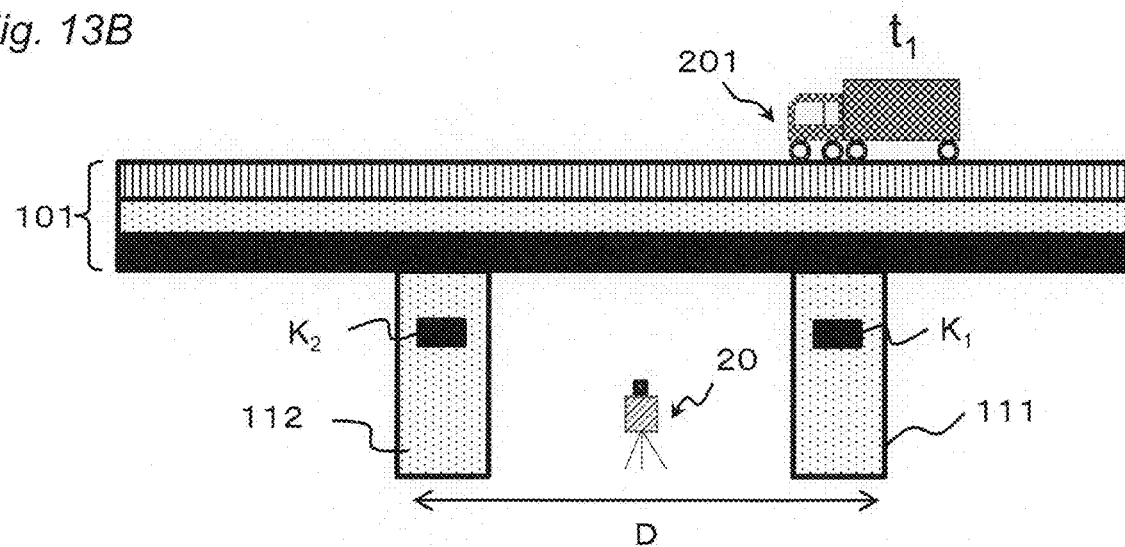
FIG. 13B is a diagram for description of the measurement interval image capturing according to Embodiments 3 to 6.
Figure 13C:
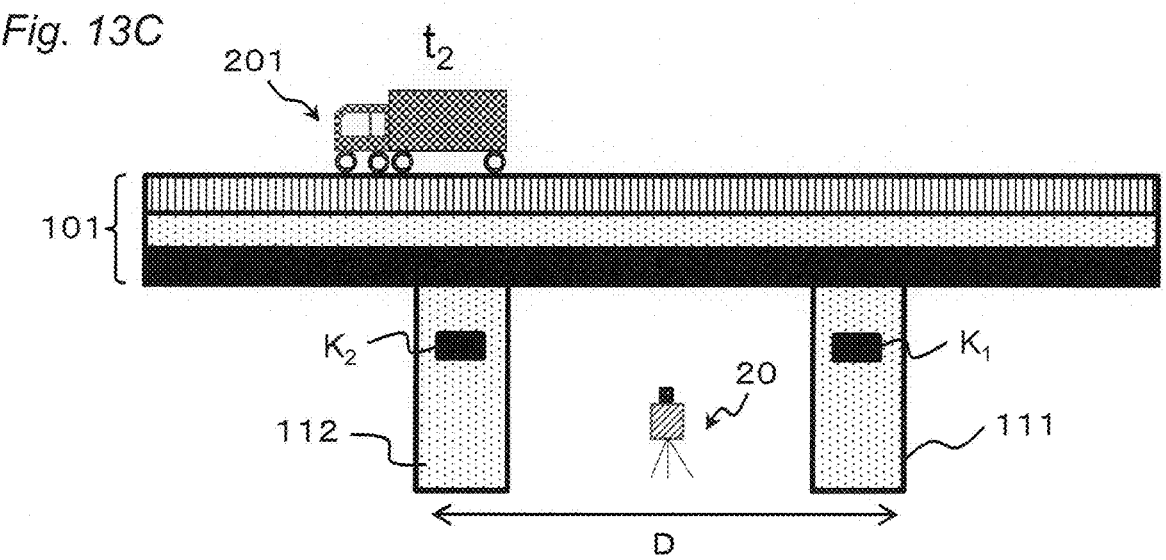
FIG. 13C is a diagram for description of the measurement interval image capturing according to Embodiments 3 to 6.

FIGS. 13A to 13C illustrate the position of the vehicle 201 traveling on the bridge 101 including the measurement interval D between the adjacent bridge piers 111 and 112. FIG. 13A illustrates the position of the vehicle 201 (position before passing through the first bridge pier 111) at a start time $t_0$ of image capturing through the visible light camera 10, FIG. 13B illustrates the position of the vehicle 201 passing through the first bridge pier 111 (at a passing-through time $t_1$), and FIG. 13C illustrates the position of the vehicle 201 passing through the second bridge pier 112 (at a passing-through time $t_2$). The bridge piers 111 and 112 supporting the bridge 101 are provided with bridge pier numbers $K_1$ and $K_2$, respectively, for identifying the bridge piers 111 and 112, and the bridge pier numbers $K_1$ and $K_2$ are written on the surfaces of the bridge piers 111 and 112. To calculate stress distribution in the measurement interval D from the bridge pier ill to the bridge pier 112, the infrared image analysis device 70 first acquires information indicating the passing-through times $t_1$ and $t_2$ from the visible image analysis device 60, and specifies, from among infrared image data, a start frame corresponding to a time at which the vehicle 201 passes through the bridge pier 111, and an end frame corresponding to a time at which the vehicle 201 passes through the bridge pier 112.

Figure 14:
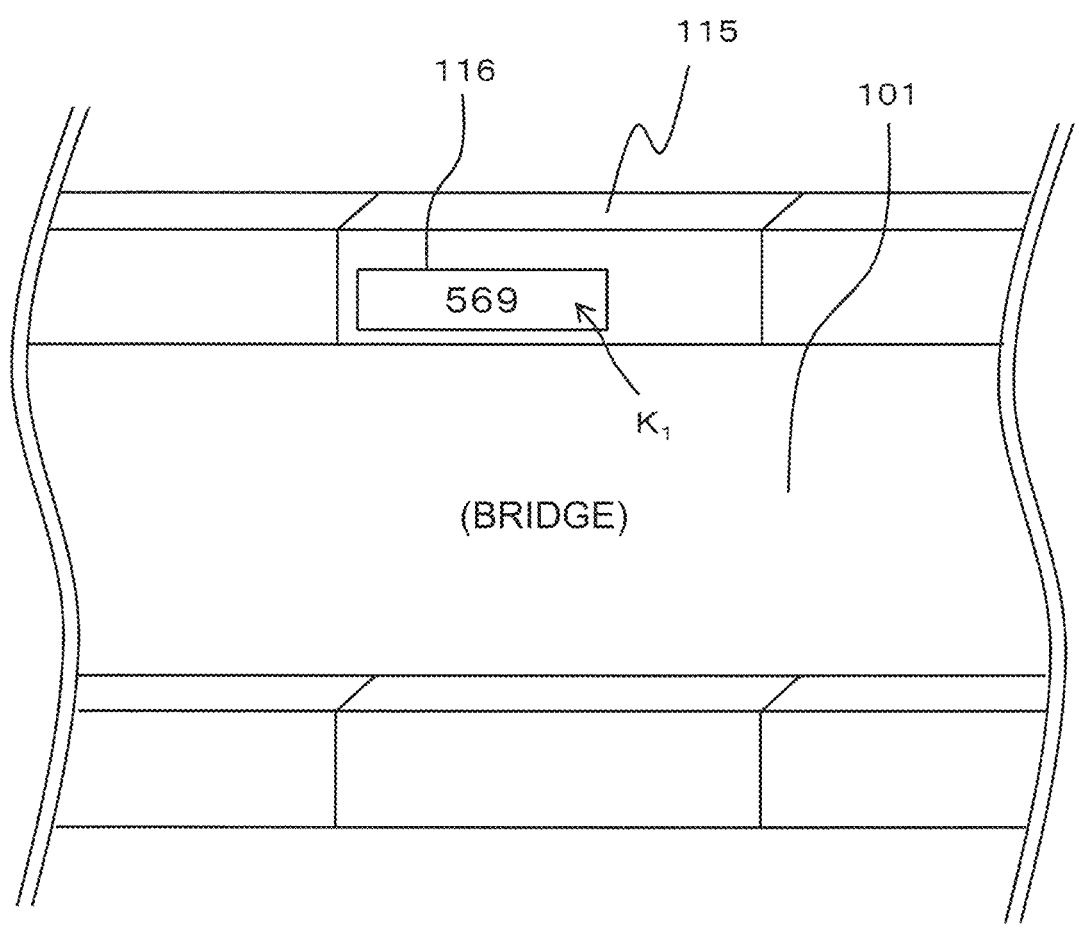
FIG. 14 is a diagram for description of bridge pier number image capturing according to Embodiments 3 to 6.

FIG. 14 illustrates an exemplary bridge pier number (the bridge pier number $K_1$ of the bridge pier 111) of which the visible light camera 10 performs image capturing. A plate (identification display object) 116 on which a bridge pier number is written is attached at a position on a sidewall 115 on the bridge 101 corresponding to a position at which each of a plurality of bridge piers including the bridge piers 111 and 112 is disposed. The visible light camera 10 performs image capturing of the bridge pier number $K_1$ or $K_2$ written on the plate 116 by performing image capturing of the sidewall 115 from the traveling vehicle 201.

Figure 15:
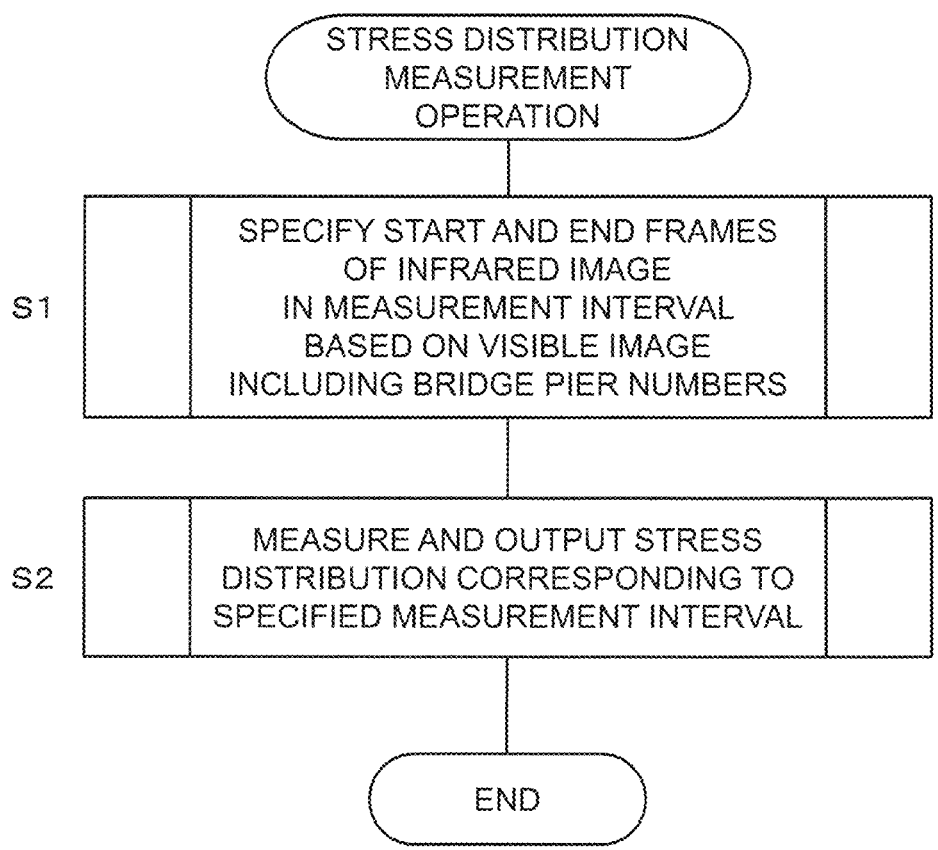
FIG. 15 is a flowchart for description of the entire operation of stress distribution measurement according to Embodiments 3 to 6.

FIG. 15 illustrates a flowchart of the entire stress distribution measurement operation performed by the stress distribution measurement system 1. The stress distribution measurement system 1 performs image capturing of the bridge pier number $K_1$ or $K_2$ written on the plate 116 from the vehicle 201 through the visible light camera 10. The stress distribution measurement system 1 further performs image capturing of the bridge 101 from below the bridge 101 through the infrared camera 20. The stress distribution measurement system 1 specifies the start frame (frame obtained by image capturing at a timing when the vehicle 201 passes through the target bridge pier 111 illustrated in FIG. 13B) of the measurement interval D in infrared image data based on frames of visible image data obtained by image capturing of the bridge pier number $K_1$. The stress distribution measurement system 1 further specifies the end frame (frame obtained by image capturing at a timing when the vehicle 201 passes through the target bridge pier 112 illustrated in FIG. 13C) of the measurement interval D based on frames of visible image data obtained by image capturing of the bridge pier number $K_2$ (S1). The stress distribution measurement system 1 measures stress distribution corresponding to the measurement interval D based on frames between the specified start and end frames, and outputs the stress distribution (S2). Specific processing of the stress distribution measurement and outputting at step S2 corresponds to the processing at steps S108 to S110 in FIG. 3. In the present embodiment, the specification of the start and end frames of the measurement interval D at step S1 is different from that in Embodiment 1. The following describes step S1 in detail.

[3-2-2. Visible Image Data Generation and Analysis]

Figure 16A:
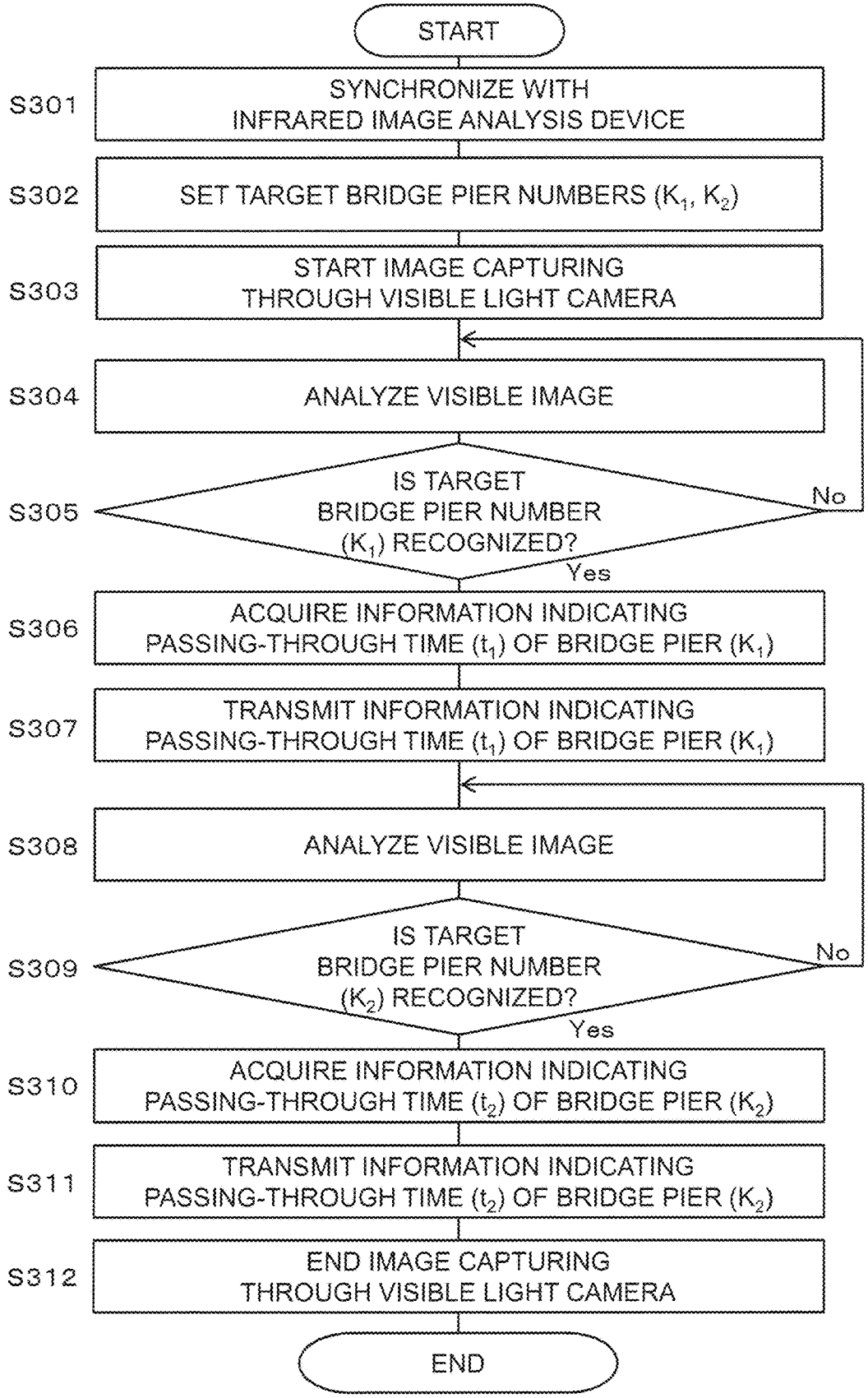
FIG. 16A is a flowchart for description of a frame specifying operation performed by a visible image analysis device according to Embodiment 3 during image capturing.
Figure 16B:
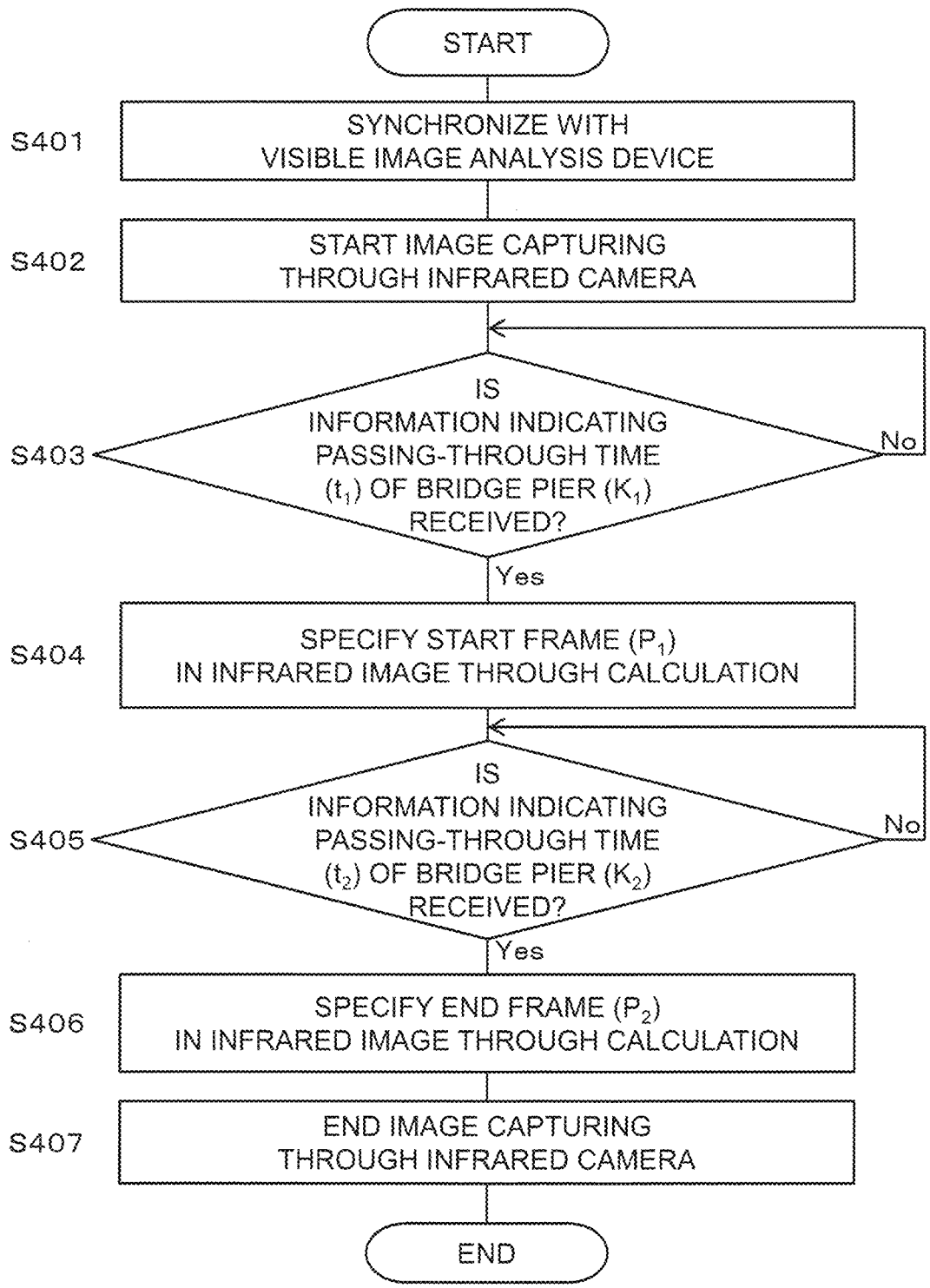
FIG. 16B is a flowchart for description of a frame specifying operation performed by an infrared image analysis device according to Embodiment 3 during image capturing.

FIG. 16A illustrates an operation performed by the controller 64 of the visible image analysis device 60, and FIG. 16B illustrates an operation performed by the controller 74 of the infrared image analysis device 70. All steps in FIG. 16A and all steps in FIG. 16B correspond to details of step S1 illustrated in FIG. 15.

The following first describes operations of the visible image analysis device 60 with reference to FIG. 16A. The controller 64 of the visible image analysis device 60 synchronizes with the controller 74 of the infrared image analysis device 70 (S301). For example, the controller 64 of the visible image analysis device 60 and the controller 74 of the infrared image analysis device 70 each synchronizes with an identical personal computer to synchronize times at the visible image analysis device 60 and the infrared image analysis device 70.

The controller 64 of the visible image analysis device 60 sets, as target bridge pier numbers, the bridge pier numbers $K_1$ and $K_2$ of the bridge piers 111 and 112 as the starting and end points of the measurement interval D (S302). For example, when the user inputs the bridge pier numbers $K_1$ and $K_2$ to the operation unit 63, the controller 64 sets the input bridge pier numbers $K_1$ and $K_2$ as target bridge pier numbers. Alternatively, the controller 64 reads information of the bridge pier numbers $K_1$ and $K_2$ stored in the storage unit 62 in advance, and sets the bridge pier numbers $K_1$ and $K_2$ as target bridge pier numbers.

The controller 64 starts image capturing through the visible light camera 10 (S303). For example, when the image capturing start time $t_0$ is set in advance, the controller 64 starts the image capturing when the current time of the visible image analysis device 60 matches with the image capturing start time $t_0$. In another example, the controller 64 starts the image capturing when an image capturing start instruction is input from the user through the operation unit 63. In the image capturing, the controller 64 sequentially acquires visible image data generated by image capturing through the visible light camera 10, and records the visible image data in the storage unit 62. In this case, the controller 64 records a time (JST time) when each frame of the visible image data is recorded in the storage unit 62 in association with the frame. Specifically, for example, a time stamp indicating a record time is provided to each frame. The time stamp is a time with which each of a plurality of frames of the visible image data can be identified, and includes, for example, units of "hour:minute:second:millisecond". When the visible light camera 10 provides each frame with a time stamp indicating an image capturing time (JST time) of the frame, the controller 64 may omit the recording of a record time.

During the image capturing through the visible light camera 10, the controller 64 analyzes the visible image data recorded in the storage unit 62 (S304), and determines whether the target bridge pier number $K_1$ is recognized (S305). In other words, the controller 64 determines whether an image of the target bridge pier number $K_1$ is included in a frame of the visible image data. When no image of the target bridge pier number $K_1$ is included in a frame (No at S305), the visible image data analysis is continued until the target bridge pier number $K_1$ is recognized. When an image of the target bridge pier number $K_1$ is included in a frame (Yes at S305), the controller 64 acquires information indicating a time $t_1$ at which the vehicle 201 passes through the bridge pier 111 with the target bridge pier number $K_1$ (S306). Specifically, for example, a record time (time stamp) recorded in association with a frame including an image of the target bridge pier number is acquired as the information indicating the time $t_1$ at which the vehicle 201 passes through the target bridge pier number $K_1$. The controller 64 transmits, to the infrared image analysis device 70 through the second communication unit 65, the information indicating the time $t_1$ at which the vehicle 201 passes through the bridge pier 111 with the target bridge pier number $K_1$ (S307).

After the target bridge pier number $K_1$ is recognized, the controller 64 further continues the visible image data analysis (S308), and determines whether the target bridge pier number $K_2$ is recognized (S309). In other words, the controller 64 determines whether an image of the target bridge pier number $K_2$ is included in a frame of the visible image data. When no image of the target bridge pier number $K_2$ is included in a frame (No at S309), the visible image data analysis is continued until the target bridge pier number $K_2$ is recognized. When an image of the target bridge pier number $K_2$ is included in a frame (Yes at S309), the controller 64 acquires information indicating a time $t_2$ at which the vehicle 201 passes through the bridge pier 112 with the target bridge pier number $K_2$ (S310). For example, a record time (time stamp) recorded in association with a frame including an image of the target bridge pier number $K_2$ is acquired as the information indicating the time $t_2$ at which the vehicle 201 passes through the target bridge pier number $K_2$. The controller 64 transmits, to the infrared image analysis device 70 through the second communication unit 65, the information indicating the time $t_2$ at which the vehicle 201 passes through the bridge pier 112 with the target bridge pier number $K_2$ (S311).

After the controller 64 recognizes the target bridge pier number $K_2$, the controller 64 ends the image capturing through the visible light camera 10 (S312). The image capturing may be ended when the user inputs an image capturing end instruction to the operation unit 63, or when a predetermined time has elapsed since the image capturing is started.

[3-2-3. Infrared Image Data Generation and Analysis]

The following describes operations of the infrared image analysis device 70 with reference to FIG. 16B. The controller 74 of the infrared image analysis device 70 synchronizes with the controller 64 of the visible image analysis device 60 (S401). For example, as described above, the controller 74 of the infrared image analysis device 70 and the controller 64 of the visible image analysis device 60 each synchronize with an identical personal computer to synchronize times at the infrared image analysis device 70 and the visible image analysis device 60.

The controller 74 starts image capturing through the infrared camera 20 (S402). For example, when an image capturing start time $T_0$ is set in advance, the controller 74 starts the image capturing when the current time of the infrared image analysis device 70 matches with the image capturing start time $T_0$. In another example, the controller 74 starts the image capturing when an image capturing start instruction is input from the user through the operation unit 37. In generating a frame of infrared image data, the infrared camera 20 associates the frame with an image capturing time (JST time). For example, each frame is provided with a time stamp indicating the image capturing time. The time stamp is a time with which each of a plurality of frames of the infrared image data can be specified, and includes, for example, units of "hour:minute:second:millisecond". During the image capturing, the controller 74 sequentially acquires infrared image data generated by image capturing through the infrared camera 20, and stores the infrared image data in the storage unit 72. When the infrared camera 20 does not provide each frame with a time stamp indicating an image capturing time (JST time) of the frame, the controller 74 may record, in association with each frame of the infrared image data, a time (JST time) at which the frame is recorded in the storage unit 72. For example, the controller 74 may provide each frame with a time stamp indicating a record time.

The controller 74 of the infrared image analysis device 70 determines whether the information indicating the time $t_1$ at which the vehicle 201 passes through the bridge pier 111 with the target bridge pier number $K_1$ is received through the second communication unit 75 (S403). Specifically, the controller 74 determines whether the information indicating the passing-through time $t_1$ transmitted from the visible image analysis device 60 at step S307 in FIG. 16A is received. When the information indicating the time $t_1$ at which the vehicle 201 passes through the bridge pier 111 with the target bridge pier number $K_1$ is received, the controller 74 specifies a start frame in the infrared image data through calculation (S404). Specifically, first, a time $T_1$ at which the vehicle 201 passes through the bridge pier 111 with the target bridge pier number $K_1$ in the infrared image data is set to be the passing-through time $t_1$ acquired from the visible image analysis device 60, and the frame number of the start frame is calculated by Expression (2) below. Accordingly, a start frame $P_1$ is specified.

$$P_1 = (T_1 - T_0) \times R \qquad (2)$$

In the expression, $P_1$ represents a frame number since image capturing is started, $T_0$ represents a time at which image capturing through the infrared camera 20 is started, and R represents the frame rate of the infrared camera 20.

Thereafter, the controller 74 of the infrared image analysis device 70 determines whether the information indicating the time $t_2$ at which the vehicle 201 passes through the bridge pier 112 with the target bridge pier number $K_2$ is received through the second communication unit 75 (S405). Specifically, the controller 74 determines whether the information indicating the passing-through time $t_2$ transmitted from the visible image analysis device 60 at step S311 in FIG. 16A is received. When the information indicating the time $t_2$ which the vehicle 201 passes through the bridge pier 112 with the target bridge pier number $K_2$ is received, the controller 74 specifies an end frame in the infrared image data through calculation (S406). Specifically, first, a time $T_2$ at which the vehicle 201 passes through the bridge pier 112 with the target bridge pier number $K_2$ in the infrared image data is set to be the passing-through time $t_2$ acquired from the visible image analysis device 60, and the frame number of the end frame is calculated by Expression (3) below. Accordingly, an end frame $P_2$ is specified.

$$P_2 = (T_2 - T_0) \times R \qquad (3)$$

In the expression, $P_2$ represents a frame number since image capturing is started, $T_0$ represents a time at which image capturing through the infrared camera 20 is started, and R represents the frame rate of the infrared camera 20.

After the end frame $P_2$ is specified, the controller 64 ends the image capturing through the infrared camera 20 (S407). The image capturing may be ended when the user inputs an image capturing end instruction to the operation unit 73, or when a predetermined time has elapsed since the image capturing is started.

[3-3. Effects]

The stress distribution measurement method according to the present disclosure measures stress distribution generated on the bridge 101 (beam part) provided between the bridge piers 111 and 112 when the vehicle 201 (moving object) moves along a structural object including the bridge piers 111 and 112 (two support parts) and the bridge 101. The method includes: the step (S303) of generating visible image data (first image data) by performing, from the vehicle 201 through the visible light camera 10 (first image capturing unit), image capturing of the plate 116 (identification display object) that is attached to a sidewall on the bridge 101 and on which a bridge pier number is written; the step (S305 to S307, S309 to S311, S403 to S406) of calculating the movement duration in which the vehicle 201 moves between the bridge piers 111 and 112 based on the visible image data; the step (S402) of generating thermal image data (infrared image data, second image data) in accordance with temperature at the surface of the bridge 101 by performing image capturing of the surface of the bridge 101 through the infrared camera 20 (second image capturing unit); the step (S108) of calculating a temperature change amount based on a thermal image data group corresponding to the movement duration in the thermal image data; and the step (S109) of calculating a stress change amount based on the temperature change amount to calculate stress distribution generated on the surface of the bridge 101 based on the stress change amount. With this configuration, infrared image data corresponding to the measurement interval D can be accurately extracted from among the infrared image data obtained by image capturing through the infrared camera 20. Accordingly, the accuracy of measuring the stress distribution generated on the bridge 101 when the vehicle 201 travels on the bridge 101 can be improved.

Specifically, the visible image data (first image data) and the infrared image data (second image data) each include a plurality of frames. In the step of calculating the movement duration, from among the plurality of frames of the visible image data, frames including images of the target bridge pier numbers $K_1$ and $K_2$ of the respective bridge piers 111 and 112 (two support parts) (images of identification display objects) are specified as start and end frames of the movement duration in the visible image data (S305 to S307, S309 to S311), and start and end frames of the movement duration in the infrared image data are specified from among the plurality of frames of the infrared image data based on the specified start and end frames in the visible image data (S403 to S406). More specifically, the times $t_1$ and $t_2$ at which the vehicle 201 passes through the respective bridge piers 111 and 112 are specified based on the specified start and end frames in the visible image data, and the start and end frames of the movement duration in the infrared image data are specified from among the plurality of frames of the infrared image data based on the specified times. With this configuration, infrared image data corresponding to the measurement interval D can be accurately extracted from among the infrared image data obtained by image capturing through the infrared camera 20.

The stress distribution measurement system 1 according to the present disclosure measures stress distribution generated on the bridge 101 (beam part) provided between the bridge piers 111 and 112 when the vehicle 201 (moving object) moves along a structural object including the bridge piers 111 and 112 (two support parts) and the bridge 101. The system includes: the visible light camera 10 (first image capturing unit) configured to generate visible image data (first image data) by performing, from the vehicle 201, image capturing of the plate 116 (identification display object) that is attached to a sidewall on the bridge 101 and on which a bridge pier number is written; the infrared camera (second image capturing unit) configured to generate thermal image data (infrared image data, second image data) in accordance with temperature at the surface of the bridge 101 by performing image capturing of the surface of the bridge 101; the visible image analysis device 60; and the infrared image analysis device 70. The controller 64 of the visible image analysis device 60 and the controller 74 of the infrared image analysis device 70 (first calculation unit) calculate the movement duration in which the vehicle 201 moves between the bridge piers 111 and 112 based on the visible image data. Specifically, the controller 64 of the visible image analysis device 60 acquires information specifying start and end points of the movement duration from the visible image data, and the controller 74 of the infrared image analysis device 70 calculates start and end frames corresponding to the movement duration in the infrared image data (thermal image data) based on the information specifying the start and end points of the movement duration. The controller 74 of the infrared image analysis device 70 (second calculation unit) calculates a temperature change amount based on a thermal image data group corresponding to the movement duration in the thermal image data. The controller 74 of the infrared image analysis device 70 (third calculation unit) further calculates a stress change amount based on the temperature change amount, and calculates the stress distribution generated on the surface of the bridge 101 based on the stress change amount. With this configuration, infrared image data corresponding to the measurement interval D can be accurately extracted from among the infrared image data obtained by image capturing through the infrared camera 20. Accordingly, the accuracy of measuring the stress distribution generated on the bridge 101 when the vehicle 201 travels on the bridge 101 can be improved.

Embodiment 4

In Embodiment 3, information indicating the passing-through times $t_1$ and $t_2$ of the bridge piers 111 and 112 with the target bridge pier numbers $K_1$ and $K_2$ is transmitted from the visible image analysis device 60 to the infrared image analysis device 70 to specify start and end frames in infrared image data. In the present embodiment, the specification of start and end frames in infrared image data is performed by another method. Specifically, in the present embodiment, start and end frames in infrared image data are specified by transmitting a trigger signal from the visible image analysis device 60 to the infrared image analysis device 70. The configuration of the stress distribution measurement system 1 according to the present embodiment is identical to the configuration illustrated in FIG. 12.

Figure 17B:
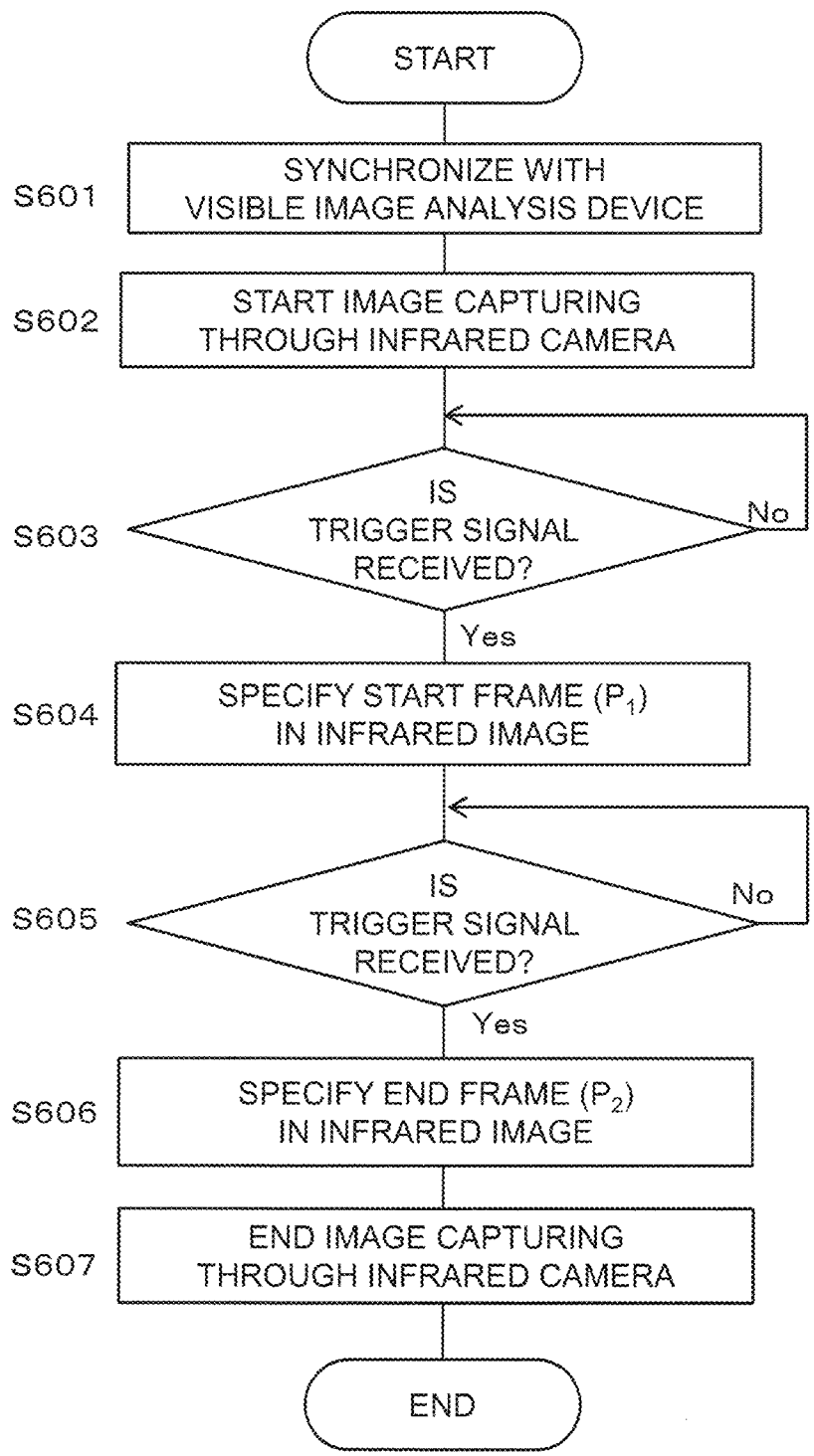
FIG. 17B is a flowchart for description of a frame specifying operation performed by an infrared image analysis device according to Embodiment 4 during image capturing.

FIG. 17A illustrates an operation performed by the controller 64 of the visible image analysis device 60, and FIG. 17B illustrates an operation performed by the controller 74 of the infrared image analysis device 70. All steps in FIG. 17A and all steps in FIG. 17B correspond to details of step S1 in FIG. 15.

Steps S501 to S505 in FIG. 17A are identical to steps S301 to S305 in FIG. 16A. Steps S507, S508, and S510 in FIG. 17A are identical to steps S308, S309, and S312, respectively, in FIG. 16A. In the present embodiment, when the target bridge pier number $K_1$ is recognized, the controller 64 of the visible image analysis device 60 transmits a trigger signal (for example, a pulse signal) to the infrared image analysis device 70 through the second communication unit 65 (S506). In other words, when having determined that an image of the target bridge pier number $K_1$ is included in a frame of the visible image data, the controller 64 transmits the trigger signal to the infrared image analysis device 70. Similarly, when the target bridge pier number $K_2$ is recognized (Yes at S508), the controller 64 transmits a trigger signal (for example, a pulse signal) to the infrared image analysis device 70 through the second communication unit 65 (9509). In other words, when having determined that an image of the target bridge pier number $K_2$ is included in a frame of the visible image data, the controller 64 transmits the trigger signal to the infrared image analysis device 70.

Steps S601, S602, and S607 in FIG. 17B are identical to steps S401, S402, and S407, respectively, in FIG. 16B. After having started image capturing through the infrared camera 20, the controller 74 of the infrared image analysis device 70 determines whether a trigger signal (first trigger signal) is received (S603). This trigger signal is the signal transmitted from the visible image analysis device 60 at step S506 in FIG. 17A. When the first trigger signal is received, the controller 74 of the infrared image analysis device 70 specifies, as the start frame in the infrared image data, a frame of which the infrared camera 20 performs image capturing (in other words, a frame acquired from the infrared camera 20) when the first trigger signal is received (S604). Thereafter, it is determined whether a trigger signal (second trigger signal) is further received (S605). This trigger signal is the signal transmitted from the visible image analysis device 60 at step S509 in FIG. 17A. When the second trigger signal is received (Yes at S605), the controller 74 of the infrared image analysis device 70 specifies, as the end frame in the infrared image data, a frame of which the infrared camera 20 performs image capturing (in other words, a frame acquired from the infrared camera 20) when the second trigger signal is received (S604).

In this manner, according to the present embodiment, frames of which the infrared camera 20 (second image capturing unit) performs image capturing when the start and end frames in the visible image data (first image data) are specified are specified as the start and end frames of the movement duration in the infrared image data (second image data). Thus, according to the present embodiment, similarly to Embodiment 3, infrared image data corresponding to the measurement interval D can be accurately specified.

In FIG. 17A, in addition to the trigger signal transmission, the visible image analysis device 60 may acquire information indicating the passing-through times $t_1$ and $t_2$ of the bridge piers 111 and 112 from frames including images of the target bridge pier numbers $K_1$ and $K_2$, and store the information in the storage unit 62. In this case, whether start and end frames specified by trigger signals are correct can be verified based on the information indicating the passing-through times $t_1$ and $t_2$ and stored in the storage unit 62.

Embodiment 5

In Embodiments 3 and 4, the visible image analysis device 60 analyzes acquired visible image data during image capturing through the visible light camera 10, and the infrared image analysis device 70 specifies start and end frames during image capturing through the infrared camera 20. In the present embodiment, the visible image analysis device 60 analyzes generated visible image data at a predetermined timing after the image capturing through the visible light camera 10 has ended. The infrared image analysis device 70 specifies start and end frames at a predetermined timing after the image capturing through the infrared camera 20 has ended. The configuration of the stress distribution measurement system 1 according to the present embodiment is identical to the configuration illustrated in FIG. 12.

[5-1. Image Capturing]

Similarly to Embodiments 3 and 4, the visible image analysis device 60 and the infrared image analysis device 70 start image capturing through the visible light camera 10 and the infrared camera 20, respectively, after synchronization. For example, the controller 64 of the visible image analysis device 60 causes the visible light camera 10 to start image capturing based on the image capturing start time $t_0$ set in advance. Alternatively, the controller 64 causes the visible light camera 10 to start image capturing when an image capturing start instruction is input from the user through the operation unit 63. The controller 64 stores, in the storage unit 62, visible image data generated by image capturing through the visible light camera 10. The controller 64 ends the image capturing through the visible light camera 10 when a predetermined time has elapsed since the image capturing is started. The controller 64 may end the image capturing based on an image capturing end time set in advance. Alternatively, the controller 64 may end the image capturing through the visible light camera 10 when an image capturing end instruction is input from the user through the operation unit 63. Similarly, for example, the controller 74 of the infrared image analysis device 70 causes the infrared camera 20 to start image capturing based on the image capturing start time $T_0$ set in advance. Alternatively, the controller 74 causes the infrared camera 20 to start image capturing when an image capturing start instruction is input from the user through the operation unit 73. The controller 74 stores, in the storage unit 72, infrared image data generated by image capturing through the infrared camera 20. The controller 74 ends the image capturing through the infrared camera 20 when a predetermined time has elapsed since the image capturing is started. The controller 74 may end the image capturing based on an image capturing end time set in advance. Alternatively, the controller 74 may end the image capturing through the infrared camera 20 when an image capturing end instruction is input from the user through the operation unit 73.

[5-2. Analysis]

Figure 18A:
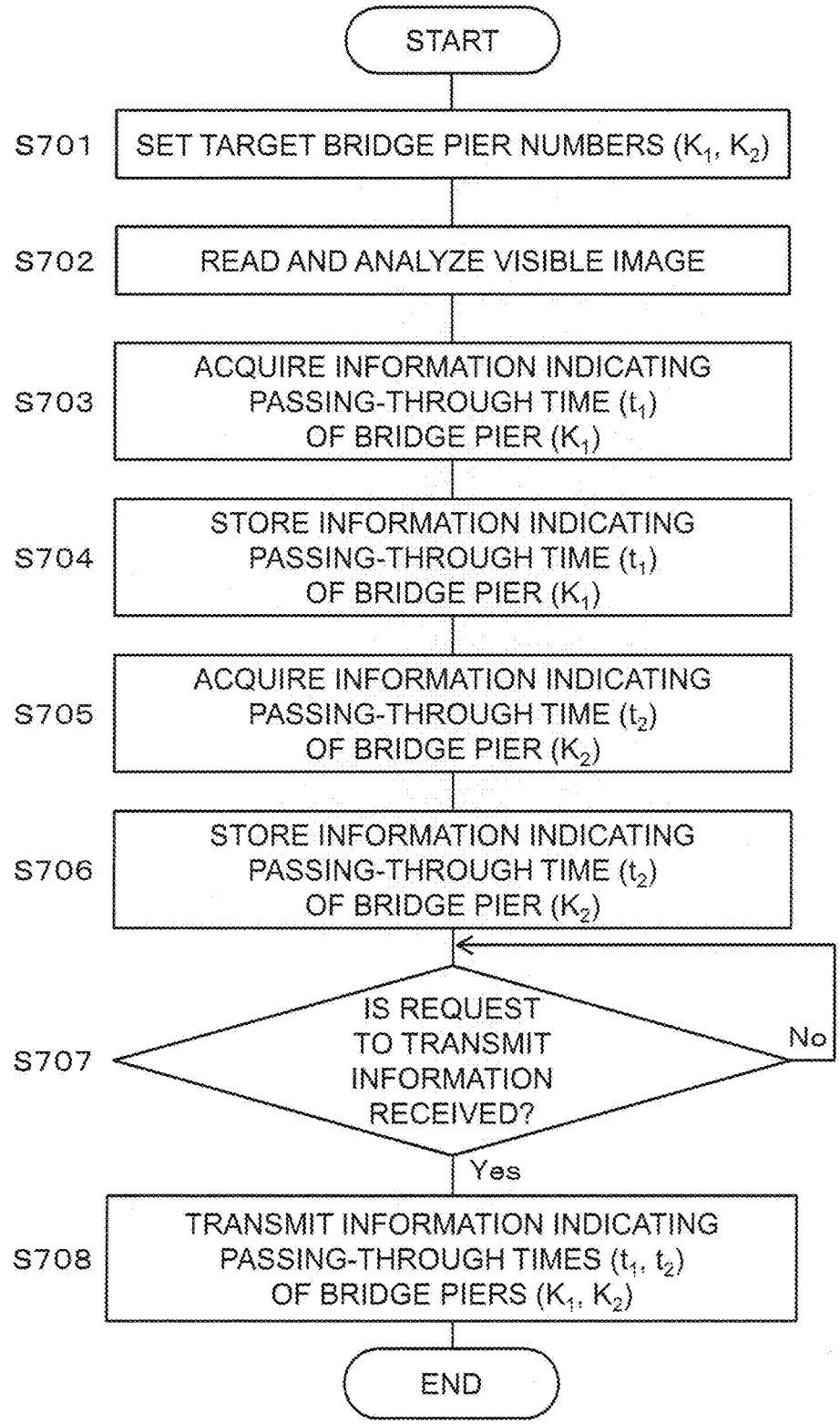
FIG. 18A is a flowchart for description of a frame specifying operation performed by a visible image analysis device according to Embodiment 5 after image capturing.
Figure 18B:
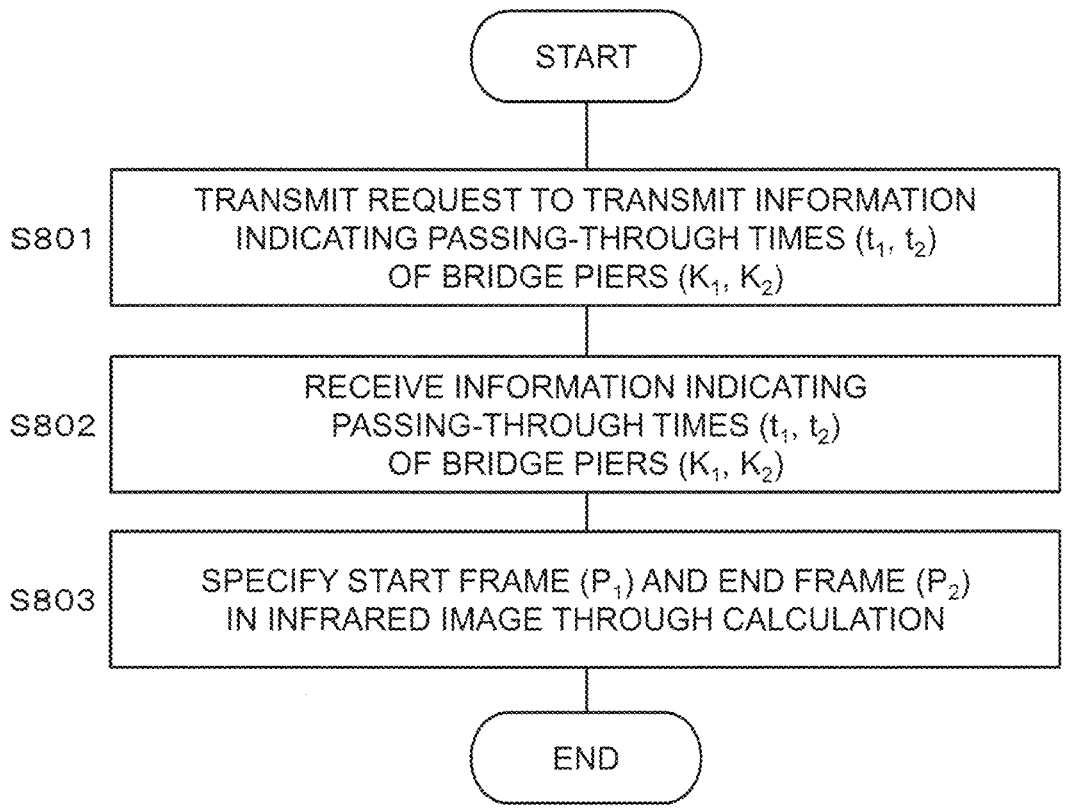
FIG. 18B is a flowchart for description of a frame specifying operation performed by an infrared image analysis device according to Embodiment 5 after image capturing.

FIG. 18A illustrates an operation performed by the controller 64 of the visible image analysis device 60, and FIG. 18B illustrates an operation performed by the controller 74 of the infrared image analysis device 70. The above-described image capturing operations through the visible light camera 10 and the infrared camera 20, all steps in FIG. 18A, and all steps in FIG. 18B correspond to details of step S1 in FIG. 15.

The following first describes an operation of the visible image analysis device 60 with reference to FIG. 18A. The controller 64 of the visible image analysis device 60 starts analysis processing illustrated in FIG. 18A at a predetermined timing. For example, the analysis processing is started at a time set in advance or when analysis start is instructed by the user. In FIG. 18A, the controller 64 of the visible image analysis device 60 sets, as target bridge pier numbers, the bridge pier numbers $K_1$ and $K_2$ of the bridge piers 111 and 112 as the starting and end points of the measurement interval D (S701). For example, when the user inputs the bridge pier numbers $K_1$ and $K_2$ to the operation unit 63, the controller 64 sets the input bridge pier numbers $K_1$ and $K_2$ as target bridge pier numbers. Alternatively, information of the bridge pier numbers $K_1$ and $K_2$ stored in the storage unit 62 is read and set as target bridge pier numbers.

The controller 64 of the visible image analysis device 60 reads visible image data from the storage unit 62 and performs image analysis (S702). When having specified a frame including an image of the target bridge pier number $K_1$, the controller 64 acquires a record time recorded in association with the specified frame (time stamp provided to the frame), as information indicating the time $t_1$ at which the vehicle 201 passes through the bridge pier 111 with the target bridge pier number $K_1$ (S703). The controller 64 stores the acquired information indicating the passing-through time $t_1$ in the storage unit 62 (S704). Subsequently, when having specified a frame including an image of the target bridge pier number $K_2$, the controller 64 acquires a record time recorded in association with the frame including an image of the target bridge pier number $K_2$ (time stamp provided to the frame), as information indicating the time $t_2$ at which the vehicle 201 passes through the bridge pier 112 with the target bridge pier number $K_2$ (S705). The controller 64 stores the acquired information indicating the passing-through time $t_2$ in the storage unit 62 (S706).

The controller 64 of the visible image analysis device 60 determines whether the request to transmit information indicating the passing-through times $t_1$ and $t_2$ of the bridge piers 111 and 112 with the target bridge pier numbers $K_1$ and $K_2$ is received from the infrared image analysis device 70 (S707). This transmission request is a transmission request transmitted from the infrared image analysis device 70 at step S801 in FIG. 18B. When the request to transmit information indicating the passing-through times $t_1$ and $t_2$ of the bridge piers 111 and 112 with the target bridge pier numbers $K_1$ and $K_2$ is received, the controller 64 reads the information indicating the passing-through times ($t_1$ and $t_2$) from the storage unit 62, and transmits the read information to the infrared image analysis device 70 (S708).

The following describes an operation of the infrared image analysis device 70 with reference to FIG. 188. The controller 74 of the infrared image analysis device 70 starts analysis processing illustrated in FIG. 18B at a predetermined timing. For example, the analysis processing is started at a time set in advance or when analysis start is instructed by the user. In FIG. 188, the controller 74 of the infrared image analysis device 70 transmits, to the visible image analysis device 60 through the second communication unit 75, a request to transmit information indicating the passing-through times $t_1$ and $t_2$ of the bridge piers 111 and 112 with the target bridge pier numbers $K_1$ and $K_2$ (S801). The controller 74 receives the information indicating the passing-through times $t_1$ and $t_2$ of the bridge piers 111 and 112 with the target bridge pier numbers $K_1$ and $K_2$ and transmitted from the visible image analysis device 60 (S802). The controller 74 specifies start and end frames in infrared image data through calculation based on the acquired information indicating the passing-through times $t_1$ and $t_2$ (S803). The specification of start and end frames is performed in a manner similar to steps S404 and S406 in FIG. 16B according to Embodiment 3. Specifically, for example, the frame numbers of start and end frames are calculated by using above-described Expressions (2) and (3). Accordingly, the start frame $P_1$ and the end frame $P_2$ are specified.

According to the present embodiment, similarly to Embodiment 3, infrared image data corresponding to the measurement interval D can be accurately extracted from among infrared image data obtained by image capturing through the infrared camera 20.

Embodiment 6

The present embodiment is a combination of Embodiments 3 to 5. Specifically, the specification of start and end frames based on calculation, which is described in Embodiment 3 or 5, and the specification of start and end frames based on a trigger signal, which is described in Embodiment 4 are both performed. The configuration of the stress distribution measurement system 1 according to the present embodiment is identical to the configuration illustrated in FIG. 12.

FIG. 19 illustrates an operation performed by the controller 74 of the infrared image analysis device 70. The controller 74 specifies start and end frames (A) in infrared image data based on a trigger signal (S901). Step S901 corresponds to all steps in FIG. 17B. The controller 74 further specifies start and end frames (B) in the infrared image data based on calculation using information indicating the passing-through times $t_1$ and $t_2$ of the bridge piers 111 and 112 with the target bridge pier numbers $K_1$ and $K_2$ (S902). Step S902 corresponds to all steps in FIG. 16B or all steps in FIG. 18B. The controller 74 determines whether the start and end frames (A) specified based on a trigger signal match with the start and end frames (B) specified based on calculation (S903). When the match is made, the start and end frames (A) specified based on a trigger signal are selected (S904). When the match is not made, the start and end frames (B) specified based on calculation are selected (S905).

In this manner, start and end frames may be specified by using two or more methods.

Other Embodiments

As described above, Embodiments 1 to 6 have been described as examples of the technique disclosed in the present application. However, the technique in the present disclosure is not limited thereto, and can also be applied to embodiments in which changes, substitutions, additions, omissions, etc. are made as appropriate. Further, it is also possible to combine the respective constituent elements described in Embodiments 1 to 6 to form a new embodiment. Other embodiments will be exemplified below.

In Embodiments 1 to 6, a method and a device that measure stress distribution generated on a bridge on which a vehicle travels have been described. The idea of the present disclosure is also applicable to a method and a device that measure stress distribution on a structural object under which a moving object moves like a monorail, or a structural object beside which a moving object moves.

In Embodiments 1 and 2, the position of a vehicle relative to a bridge pier is calculated based on the size of the front glass of the vehicle to calculate a duration in which the vehicle passes through the measurement interval D. The present disclosure is not limited thereto. The position of a vehicle relative to a bridge pier may be calculated based on the size of an optional accessory of the vehicle, such as a license plate, which is not largely different between car types. In this case, the size of an accessory such as a license plate when the vehicle is positioned on each bridge pier may be used as a reference value for calculating the position of the vehicle relative to the bridge pier.

In addition, in Embodiments 1 and 2 of the present disclosure, the position of a vehicle relative to a bridge pier may be calculated based on the ratio of the size of an accessory of the vehicle relative to the size of an accessory of a bridge, such as a road sign. In this case, the ratio of the size of an accessory of a vehicle when the vehicle is positioned on each bridge pier relative to the size of an accessory of a bridge, such as a road sign, may be used as a reference value for calculating the position of the vehicle relative to the bridge pier. According y, even when a visible light camera configured to perform image capturing of a vehicle is installed at a different position, the position of a vehicle relative to each bridge pier can be calculated without resetting the reference value.

In addition, in Embodiments 1 and 2 of the present disclosure, the position of a vehicle relative to a bridge pier may be calculated based on the distance between a visible light camera and the vehicle. In this case, the distance between the visible light camera and each bridge pier may be used as a reference value for calculating the position of the vehicle relative to the bridge pier. The distance between the visible light camera and the vehicle can be measured through image analysis of image data from two visible light cameras.

In addition, in Embodiments 1 and 2 of the present disclosure, the position of a vehicle relative to a bridge pier may be calculated based on the ratio of the distance between a visible light camera and an accessory of the vehicle relative to the distance between the visible light camera and an accessory of a bridge, such as a road sign. In this case, the ratio of the distance between the visible light camera and the accessory of the vehicle when the vehicle is positioned on each bridge pier relative to the distance between the visible light camera and the accessory of a bridge, such as a road sign, may be used as a reference value for calculating the position of the vehicle relative to the bridge pier. Accordingly, even when a visible light camera configured to perform image capturing of a vehicle is installed at a different position, the position of a vehicle relative to each bridge pier can be calculated without resetting the reference value.

In Embodiments 1 and 2, the stress distribution measurement device 30 specifies the duration in which the vehicle 201 travels through the interval D from the bridge pier 111 to the bridge pier 112 based on visible image data from the visible light camera 10, measures stress distribution generated on the bridge 101 based on thermal image data obtained by image capturing through the infrared camera 20 in the specified duration, and transmits data of the measured stress distribution to a server or the like through the Internet 2. The present disclosure is not limited thereto. The stress distribution measurement device 30 may transmit the visible image data from the visible light camera 10 and the thermal image data from the infrared camera 20 to the server, and the server may specify the duration in which the vehicle 201 travels through the interval D from the bridge pier 111 to the bridge pier 112 based on the visible image data, measure stress distribution generated on the bridge 101 based on the thermal image data obtained by image capturing through the infrared camera 20 in the specified duration, and transmit data of the measured stress distribution to the stress distribution measurement device 30.

In Embodiment 2, the vehicle weight information 40d managed by the toll terminal 40 is used to produce the stress distribution database 50d associating the vehicle weight information 40d, a vehicle number, and stress distribution data. The present disclosure is not limited thereto. A plurality of test vehicles having different known vehicle weights may be prepared in advance, stress distribution when these test vehicles travel may be measured, and data of the measured stress distribution and the known vehicle weights may be associated to produce a stress distribution database as illustrated in FIGS. 9A and 9B. Accordingly, a vehicle weight can be calculated by only measuring stress distribution at occurrence of a vehicle, and whether the vehicle is an overloaded vehicle can be detected.

In Embodiments 3 and 5, the record time of each frame of visible image data is used as information indicating the passing-through times $t_1$ and $t_2$ of the bridge piers 111 and 112 with the target bridge pier numbers $K_1$ and $K_2$. However, any optional information specifying a frame, image capturing of which is performed when the vehicle 201 passes through the bridge piers 111 and 112 may be used as information indicating the passing-through times $t_1$ and $t_2$ of the bridge piers 111 and 112. In other words, any optional information specifying the start and end frames of the measurement interval D in infrared image data may be used. For example, frame numbers $p_1$ and $p_2$ of visible image data since the start time $t_0$ of image capturing through the visible light camera 10 may be used as information indicating the passing-through times $t_1$ and $t_2$ of the bridge piers 111 and 112. In this case, the infrared image analysis device 70 acquires, from the visible image analysis device 60, the frame numbers $p_1$ and $p_2$ since the start time $t_0$ of image capturing through the visible light camera 10 at steps S403 and S405. Then, the infrared image analysis device 70 calculates the passing-through times $T_1$ and $T_2$ in infrared image data by Expressions (4) and (5) below, respectively. Thereafter, the infrared image analysis device 70 specifies the start frame $P_1$ and the end frame $P_2$ in the infrared image data by Expressions (2) and (3) described above.

$$T_1 = t_0 + p_1/r \qquad (4)$$

$$T_2 = t_0 + p_2/r \qquad (5)$$

In the expressions, r represents the frame rate of the visible light camera 10.

Other examples of information indicating the passing-through times $t_1$ and $t_2$ of the bridge piers 111 and 112 include an elapsed time since the start time $t_0$ of image capturing through the visible light camera 10, and a combination of a plurality of pieces of information (two or more of a record time (or image capturing time), an elapsed time, and a frame number).

In Embodiments 3 and 5, in the infrared image data frame calculation, when the start time $t_0$ of image capturing through the visible light camera 10 is identical to the start time $T_0$ of image capturing through the infrared camera 20, $T_1$ and $T_2$ may be set to be $t_1$ and $t_2$, respectively, without using Expressions (2) and (3) described above, and frames provided with time stamps of the image capturing times $T_1$ and $T_2$ may be extracted from among infrared image data.

The functions of each of the visible image analysis device 60, the infrared image analysis device 70, and the stress distribution measurement device 30, which are described in Embodiments 1 to 6, may be achieved by one device or a plurality of devices. For example, the infrared image analysis device 70 may acquire visible image data generated by the visible light camera 10 from the visible light camera 10 directly or through the visible image analysis device 60, and the infrared image analysis device 70 may analyze both of the visible image data and infrared image data.

Figure 20A:
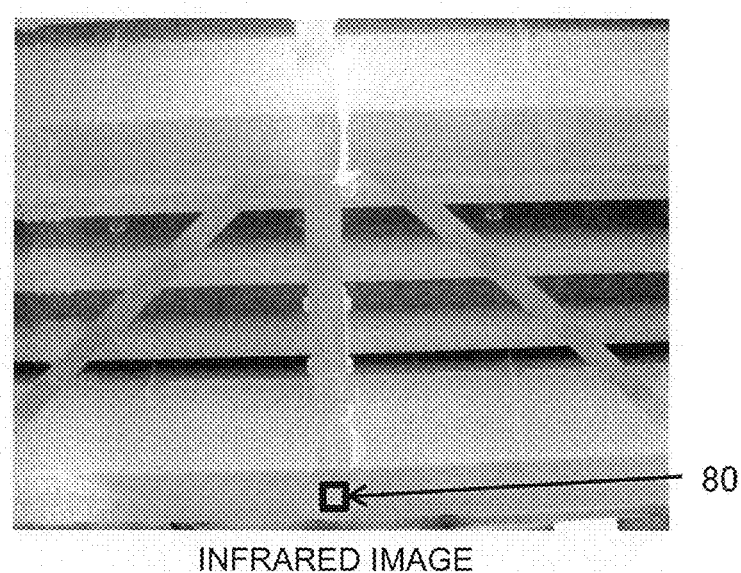
FIG. 20A is a diagram illustrating an exemplary infrared image according to another embodiment.
Figure 20B:
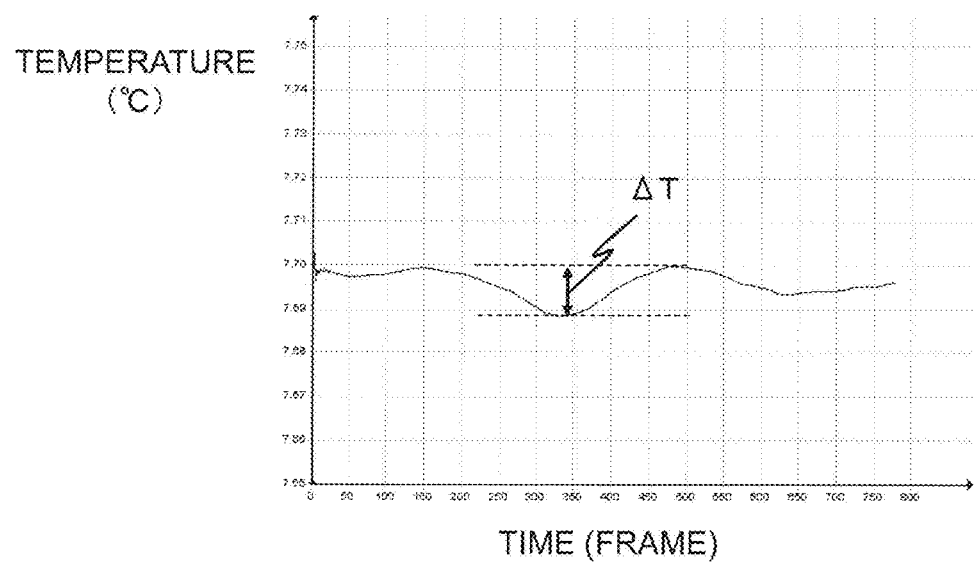
FIG. 20B is a diagram illustrating temperature change in a partial region of an infrared image.

In Embodiment 1, at step S108 in the flowchart illustrated in FIG. 3, the temperature change amount for each pixel is calculated through Fourier transform of thermal image data (infrared image data), but may be calculated by another method. FIG. 20A illustrates an infrared image (one frame). FIG. 20B illustrates temperature at each frame in a specific range 80 in the infrared image illustrated in FIG. 20A. For example, the controller 35 may determine the temperature of the specific range 80 at each frame, and calculate the temperature change amount $\Delta T$ (refer to FIG. 20B) along with temporal change (frame change). The specific range 80 is set to include one or more pixels. The temperature of the specific range 80 may be calculated as an average value of temperatures of pixels included in the specific range 80.

In Embodiments 1 to 6, the case has been described in which stress distribution generated on the bridge 101 is measured based on infrared image data, but the target of measurement using infrared image data is not limited to stress distribution. For example, a passing-through frequency (passing-through number) of vehicles may be measured by using infrared image data generated by the infrared camera 20. Temperature in the infrared image data changes when a vehicle passes over a bridge pier. During passing of a vehicle, the temperature decreases as compared to a case in which no vehicle is passing, as illustrated in FIG. 20B. Thus, the temperature change amount $\Delta T$ can be calculated from the waveform of the temperature as illustrated in FIG. 20B, and the passing-through frequency (passing-through number) of vehicles can be calculated by counting the number of times that the temperature change amount ΔT indicating temperature decrease is obtained.

The embodiments have been described above as examples of the technique in the present disclosure. To that end, the accompanying drawings and detailed description are provided. Accordingly, some of the constituent elements described in the accompanying drawings and the detailed description include not only essential constituent elements for solving the problem but also constituent elements that are not essential for solving the problem for exemplifying the technique. For this reason, such unnecessary elements should not be immediately determined as necessary elements because of their presence in the accompanying drawings and detailed description. Moreover, since the above-described embodiments are provided to illustrate the technique in the present disclosure, it is possible to make various changes, substitutions, additions, omissions, and the like within the scope of claims or the equivalent thereof.

INDUSTRIAL APPLICABILITY

The present disclosure is applicable to a stress distribution measurement method and a stress distribution measurement system that measure stress distribution generated on a structural object such as an expressway bridge when moving object such as a vehicle moves along the structural object.

What is claimed is:

1. A stress distribution measurement method of measuring stress distribution generated on a structural object including two support parts and a beam part provided between the support parts when a moving object moves along the structural object, the method comprising:

generating first data by sensing, through a first sensing unit, of the moving object moving between the support parts or between identification display objects attached to the structural object;

calculating a movement duration based on the first data, the movement duration being a period of time in which the moving object moves between the support parts of the structural object or between the identification display objects;

generating, as second data, thermal data in accordance with temperature at a surface of the beam part of the structural object by sensing of the surface of the beam part through a second sensing unit;

calculating a temperature change amount based on a second data group; and calculating a stress change amount based on the temperature change amount to calculate stress distribution generated on the surface of the beam part of the structural object based on the stress change amount, wherein the first sensing unit and the second sensing unit are synchronized such that the first data and the second data correspond to each other with respect to time, the second data group includes at least a portion of the second data, and the portion of the second data corresponds to the movement duration.

2. The stress distribution measurement method according to claim 1, wherein the first sensing unit is a GPS sensor.

3. The stress distribution measurement method according to claim 1, wherein the first sensing unit is a beacon sensor.

* * * * *